US011743613B2

United States Patent
Maehashi

(10) Patent No.: US 11,743,613 B2
(45) Date of Patent: Aug. 29, 2023

(54) PHOTOELECTRIC CONVERSION DEVICE AND PHOTODETECTION SYSTEM HAVING AVALANCHE PHOTODIODE

(71) Applicant: CANON KABUSHIKI KAISHA, Tokyo (JP)

(72) Inventor: Yu Maehashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/580,161

(22) Filed: Jan. 20, 2022

(65) Prior Publication Data

US 2022/0239852 A1 Jul. 28, 2022

(30) Foreign Application Priority Data

Jan. 22, 2021 (JP) .................................. 2021-008649

(51) Int. Cl.
*H04N 25/62* (2023.01)
*H04N 25/709* (2023.01)

(52) U.S. Cl.
CPC ........... *H04N 25/62* (2023.01); *H04N 25/709* (2023.01)

(58) Field of Classification Search
CPC .... H04N 25/62; H04N 25/709; H04N 25/772; G01S 7/4816
USPC .................................................... 348/207.99
See application file for complete search history.

(56) References Cited

U.S. PATENT DOCUMENTS

| 9,521,338 B2* | 12/2016 | Vogelsang | H04N 25/575 |
| 2020/0260043 A1* | 8/2020 | Seo | H04N 25/75 |
| 2022/0342040 A1* | 10/2022 | Hirano | G01C 3/06 |
| 2022/0350027 A1* | 11/2022 | Nishino | H01L 31/107 |

FOREIGN PATENT DOCUMENTS

JP 2019158806 A 9/2019

* cited by examiner

*Primary Examiner* — Lin Ye
*Assistant Examiner* — Chan T Nguyen
(74) *Attorney, Agent, or Firm* — Canon U.S.A., Inc., IP Division

(57) ABSTRACT

A photoelectric conversion device includes a plurality of pixels, a data line, and a receiving circuit. Each of plurality of pixels includes a photoelectric conversion unit, a processing circuit, and a pixel output circuit. The photoelectric conversion unit includes an avalanche photodiode that multiplies charge generated by an incident of photon by avalanche multiplication, and outputs a signal in accordance with the incident of photon. The processing circuit processes a signal output from the photoelectric conversion unit. The pixel output circuit controls an output of the signal processed by the processing circuit. The data line is connected to the plurality of pixels. The receiving circuit receives a pixel signal output from the plurality of pixels via the data line. An off-state leakage current of the transistor included in the receiving circuit is smaller than an off-state leakage current of the transistor included in the pixel output circuit.

18 Claims, 16 Drawing Sheets

PHOTOELECTRIC CONVERSION DEVICE AND PHOTODETECTION SYSTEM HAVING AVALANCHE PHOTODIODE

BACKGROUND

Technical Field

One disclosed aspect of the embodiments relates to a photoelectric conversion device and a photodetection system.

Description of the Related Art

A single photon avalanche diode (SPAD: Single Photon Avalanche Diode) is known as a detector capable of detecting weak light at a single photon level. SPAD amplifies signal charge excited by photon by several times to several million times by using an avalanche multiplication phenomenon generated by a strong electric field induced in a p-n junction of a semiconductor. The number of incident photons can be directly measured by converting the current generated by the avalanche multiplication phenomenon into a pulse signal and counting the number of pulse signals. Japanese Patent Application Laid-Open No. 2019-158806 discloses a photoelectric conversion device in which pixels each including avalanche photodiode are arranged in a two-dimensional array.

An image sensor using SPAD has many elements forming one pixel as compared with an image sensor using no SPAD, and one pixel includes various functional blocks. These functional blocks are required to have characteristics corresponding to these functions, but element design corresponding to the characteristics of each functional block has not been performed so far. Therefore, high functionality and low power consumption of a photoelectric conversion device using SPAD are not always sufficient.

SUMMARY

One aspect of the embodiments provides a technique for realizing further higher functionality and lower power consumption of a photoelectric conversion device and a photodetection system.

According to an aspect of the embodiments, a photoelectric conversion device includes a plurality of pixels, a data line, and a receiving circuit. Each of the plurality of pixels includes a photoelectric conversion unit, a processing circuit, and a pixel output circuit. The photoelectric conversion unit includes an avalanche photodiode that multiplies charge generated by an incident of photon by avalanche multiplication, and outputs a signal in accordance with the incident of photon. The processing circuit processes a signal output from the photoelectric conversion unit. The pixel output circuit controls an output of a signal processed by the processing circuit. The data line us connected to the plurality of pixels. The receiving circuit receives pixel signals output from the plurality of pixels via the data line. An off-state leakage current of a first transistor included in the receiving circuit is smaller than an off-state leakage current of a second transistor included in the pixel output circuit.

According to another aspect of the embodiments, a photoelectric conversion device includes a plurality of pixels, a data line, and a receiving circuit. Each of the plurality of pixels includes a photoelectric conversion unit, a processing circuit, and a pixel output circuit. The photoelectric conversion unit includes an avalanche photodiode that multiplies charge generated by an incident of photon by avalanche multiplication, and outputs a signal in accordance with the incident of photon. The processing circuit processes a signal output from the photoelectric conversion unit. The pixel output circuit controls an output of a signal processed by the processing circuit. The data line is connected to the plurality of pixels. The receiving circuit receives pixel signals output from the plurality of pixels via the data line. In a channel region of a first transistor included in the receiving circuit, an impurity concentration of an impurity of the same conductivity type as a conductivity type of the first transistor is a first concentration. In a channel region of a second transistor included in the pixel output circuit, an impurity concentration of an impurity of the same conductivity type as a conductivity type of the second transistor is a second concentration higher than the first concentration.

Further features of the embodiments will become apparent from the following description of exemplary embodiments with reference to the attached drawings.

DESCRIPTION OF THE EMBODIMENTS

Figure 1:
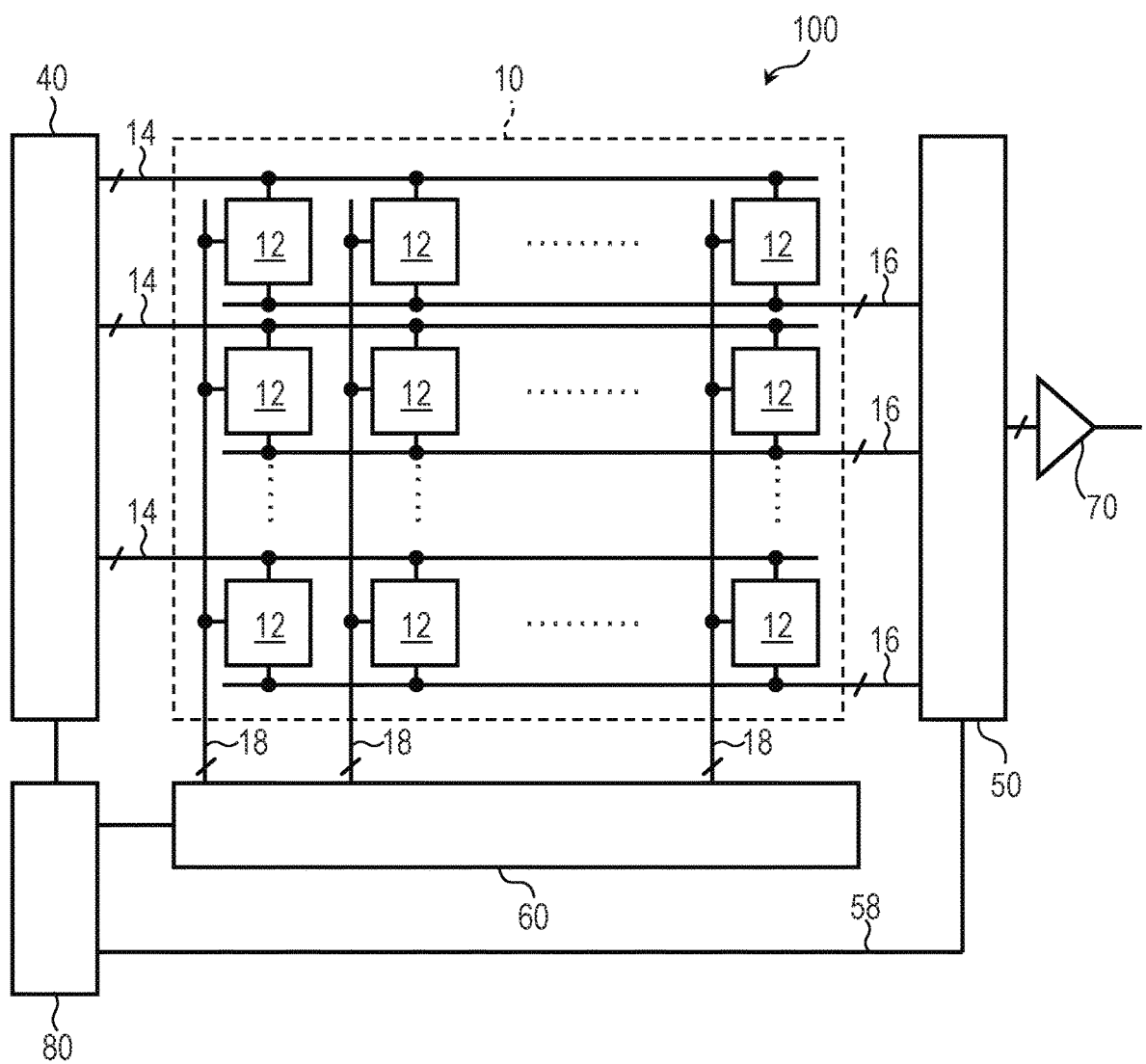
FIG. 1 and FIG. 2 are block diagrams illustrating a schematic configuration of a photoelectric conversion device according to a first embodiment.

Preferred embodiments of the disclosure will now be described in detail in accordance with the accompanying drawings.

The following embodiments are intended to embody the technical idea of the disclosure and do not limit the disclosure. The sizes and positional relationships of the members illustrated in the drawings may be exaggerated for clarity of description.

First Embodiment

Figure 2:
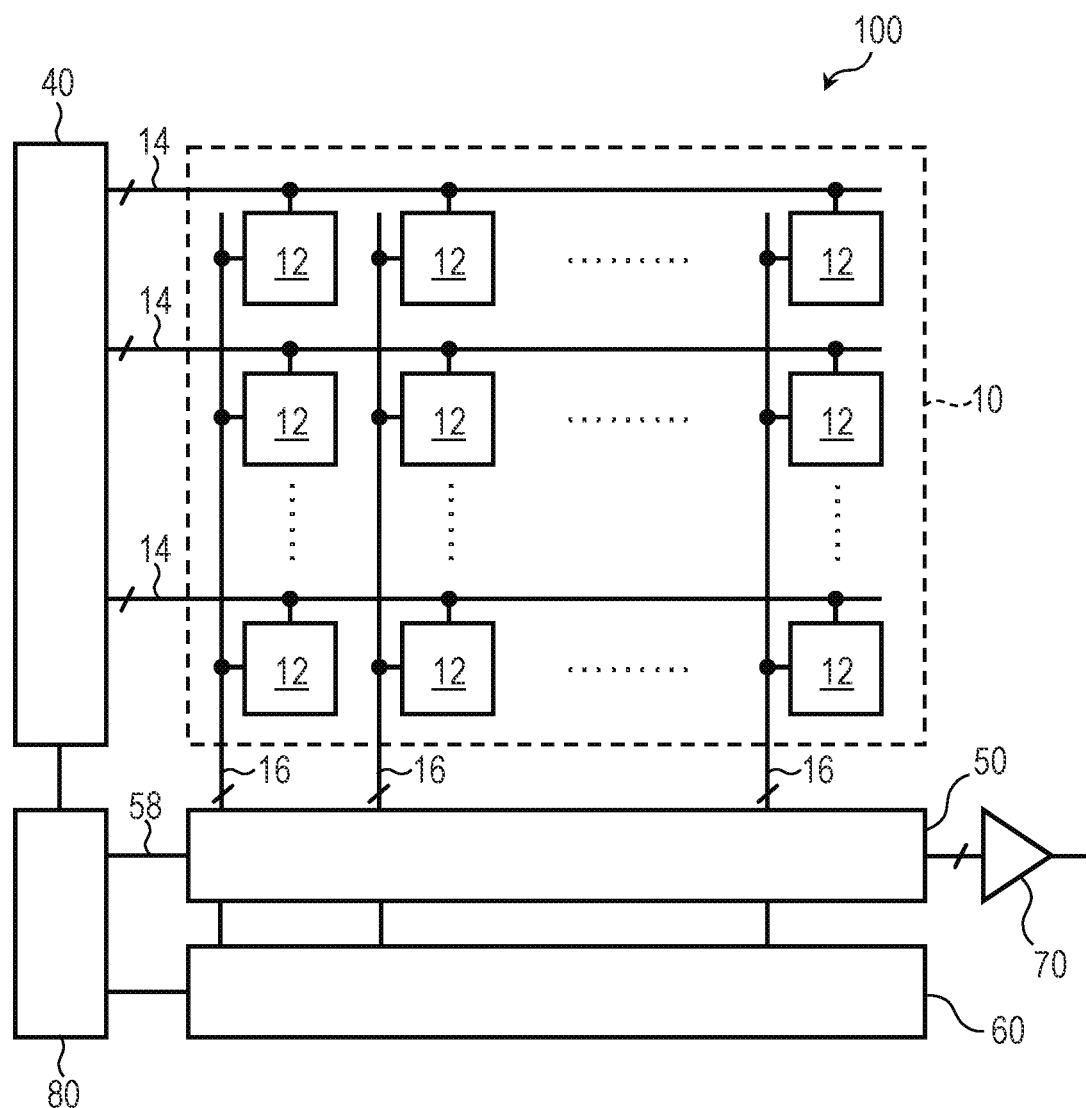
Figure 3:
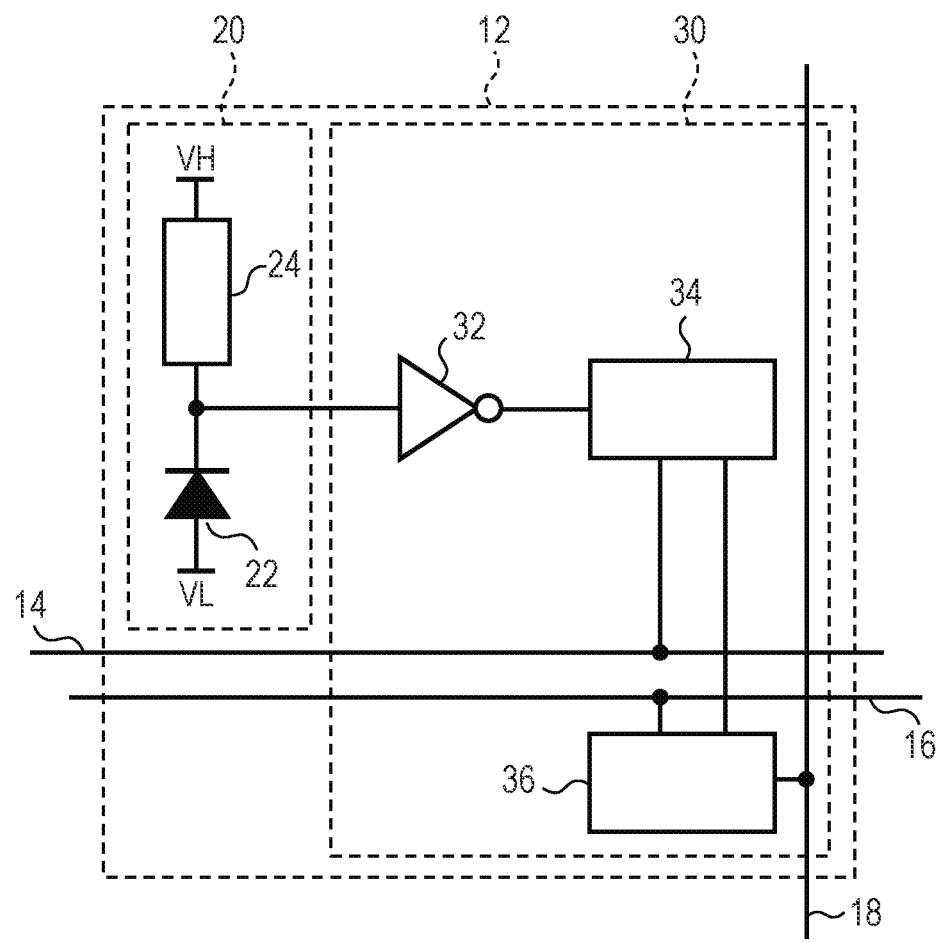
FIG. 3 is a block diagram illustrating a configuration example of a pixel in the photoelectric conversion device according to the first embodiment.
Figure 4:
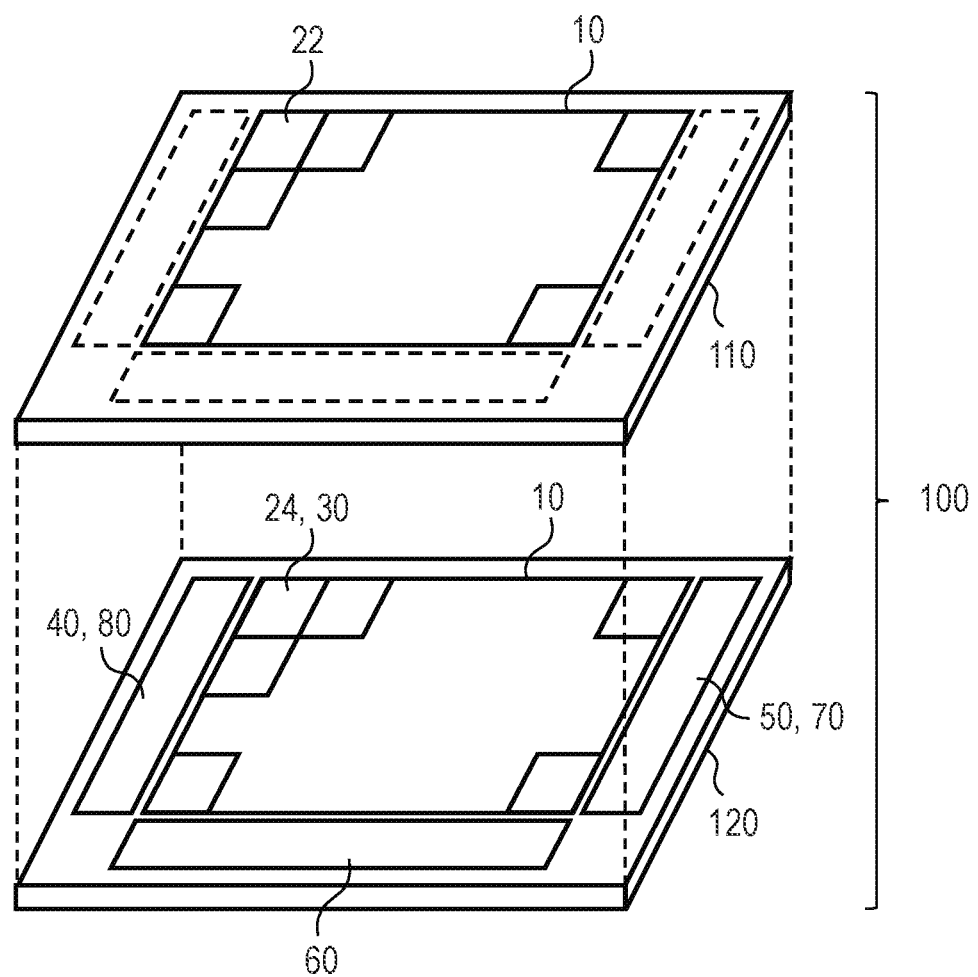
FIG. 4 is a perspective view illustrating a configuration example of the photoelectric conversion device according to the first embodiment.
Figure 5A:
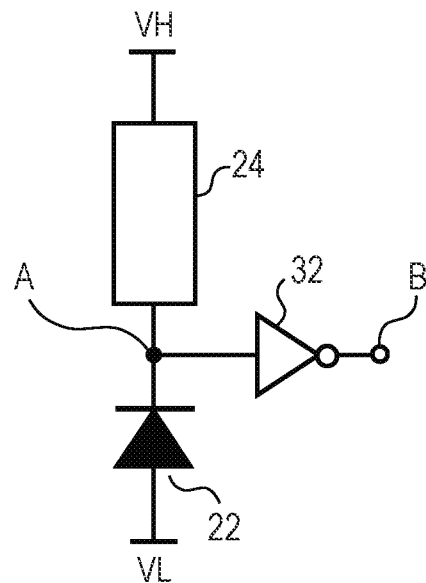
FIG. 5A, FIG. 5B, and FIG. 5C are diagrams illustrating the basic operation of the photoelectric conversion unit in the photoelectric conversion device according to the first embodiment.
Figure 5B:
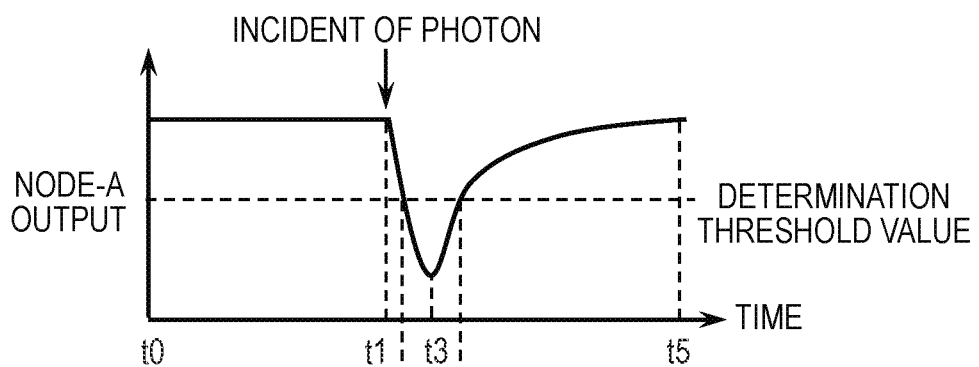
Figure 5C:
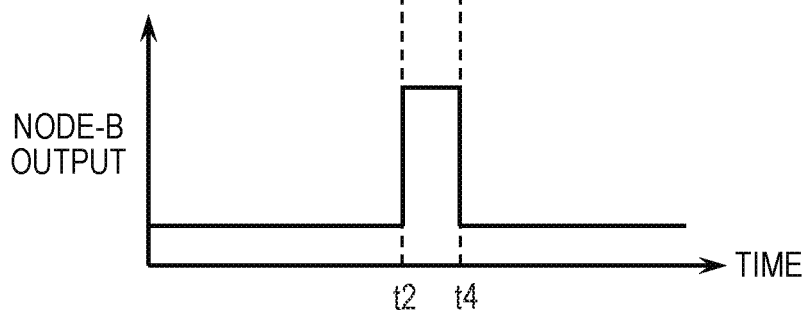
Figure 6:
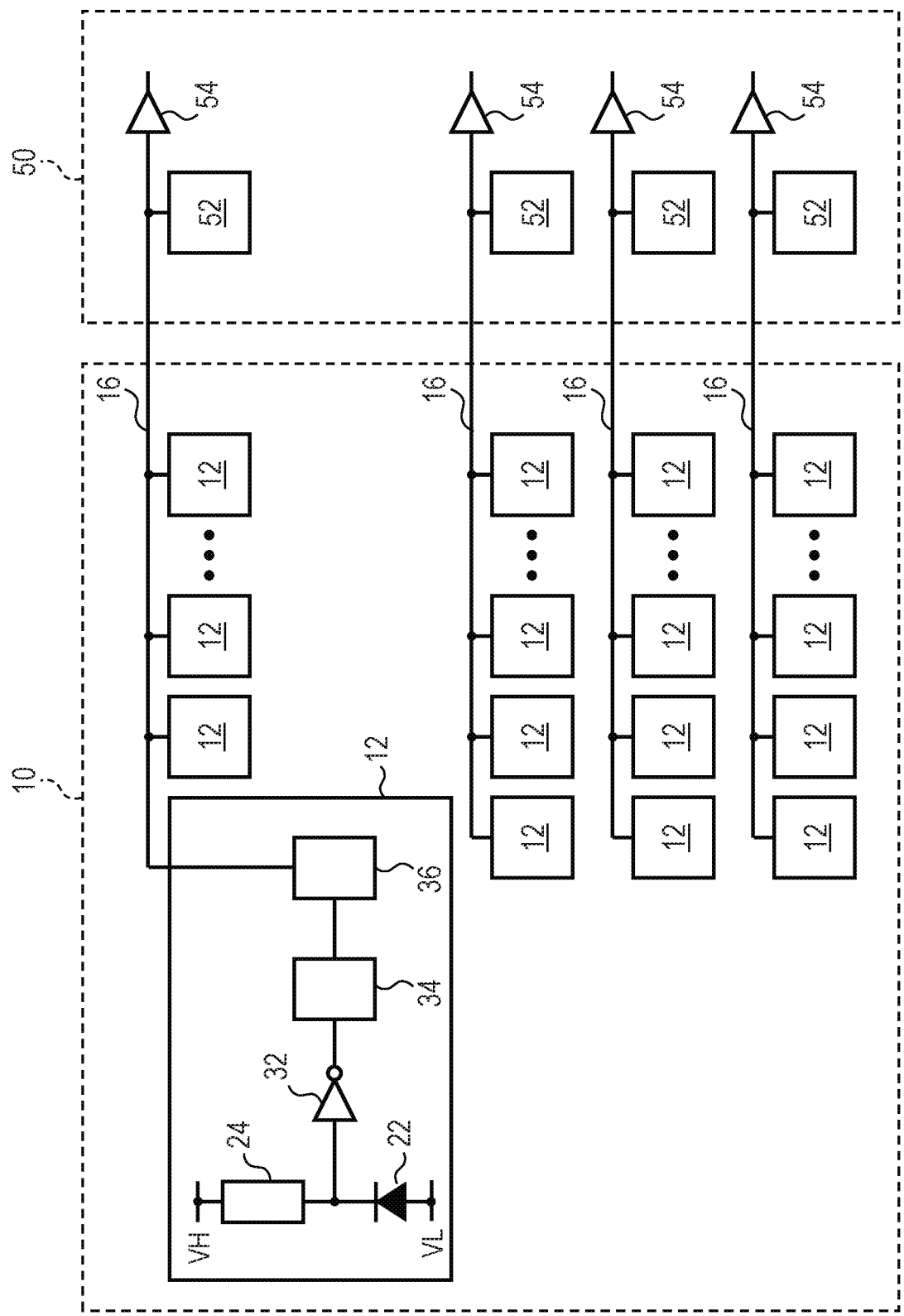
FIG. 6 is a diagram schematically illustrating a configuration example of a connection between a pixel unit and a readout circuit unit in the photoelectric conversion device according to the first embodiment.
Figure 7:
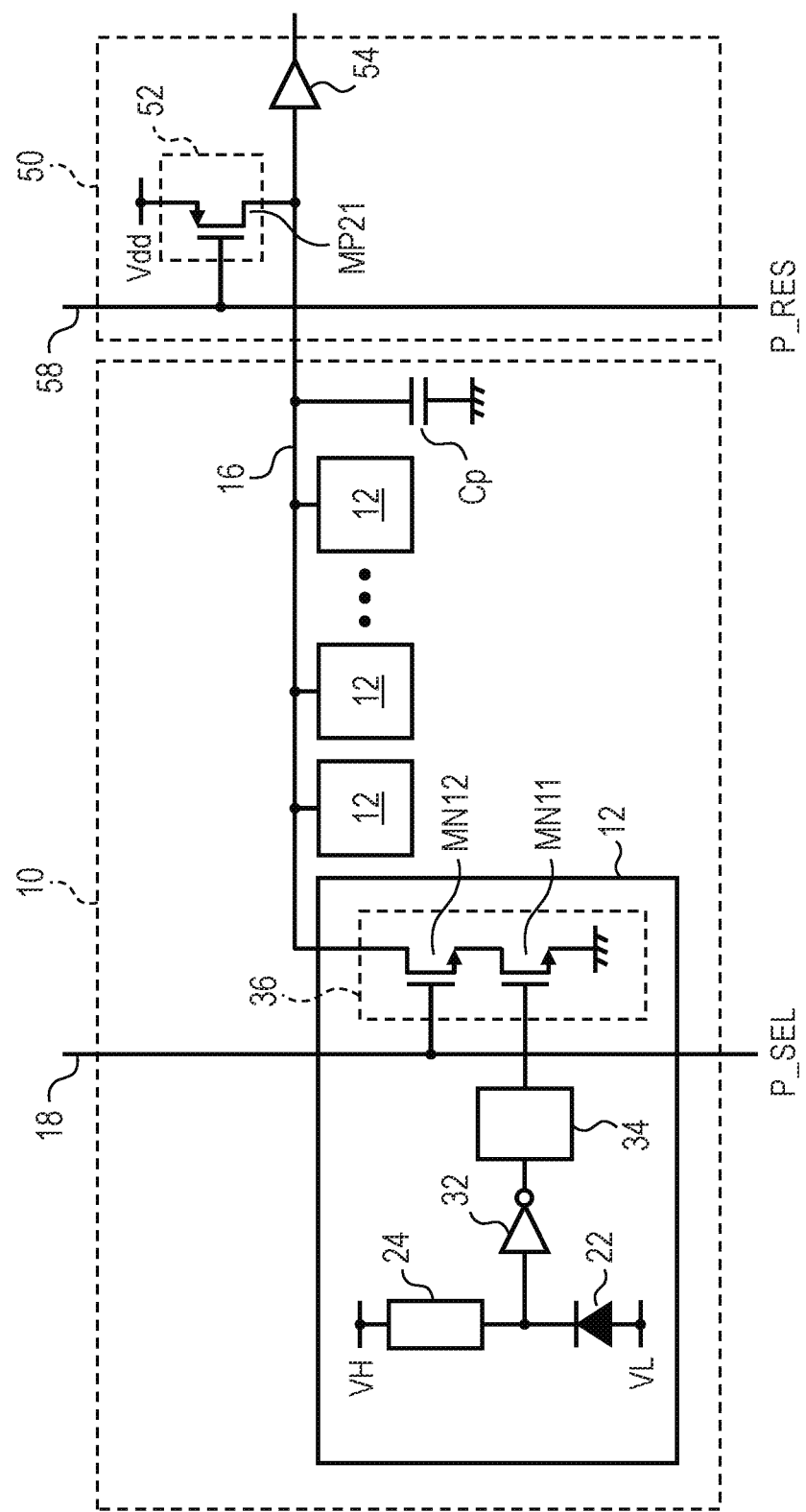
FIG. 7 is a circuit diagram illustrating a configuration example of a pixel output circuit and a reset circuit in the photoelectric conversion device according to the first embodiment.

A photoelectric conversion device according to a first embodiment will be described with reference to FIG. 1 to FIG. 8F. FIG. 1 and FIG. 2 are block diagrams illustrating a schematic configuration of a photoelectric conversion device according to the present embodiment. FIG. 3 is a block diagram illustrating a configuration example of a pixel of the photoelectric conversion device according to the present embodiment. FIG. 4 is a perspective view illustrating a configuration example of the photoelectric conversion device according to the present embodiment. FIG. 5A to FIG. 5C are diagrams illustrating the basic operation of the photoelectric conversion unit of the photoelectric conversion device according to the present embodiment. FIG. 6 is a diagram schematically illustrating a connection between a pixel unit and a readout circuit unit in the photoelectric conversion device according to the present embodiment. FIG. 7 is a circuit diagram illustrating a configuration example of a pixel output circuit and a reset circuit in the photoelectric conversion device according to the present embodiment. FIG. 8A to FIG. 8F are cross-sectional view illustrating a method of controlling the threshold voltage of a Metal Oxide Semiconductor (MOS) transistor.

As illustrated in FIG. 1, the photoelectric conversion device 100 according to the present embodiment includes a pixel unit or circuit 10, a vertical scanning circuit unit 40, a readout circuit unit 50, a horizontal scanning circuit unit 60, an output circuit unit 70, and a control pulse generation unit or circuit 80.

The pixel unit 10 is provided with a plurality of pixels 12 arranged in an array so as to form a plurality of rows and a plurality of columns. As will be described later, each pixel 12 may include a photoelectric conversion unit, or photoelectric conversion circuit, including a photon detection element and a pixel signal processing unit that processes a signal output from the photoelectric conversion unit. The number of pixels 12 included in the pixel unit 10 is not particularly limited. For example, the pixel unit 10 may be constituted by a plurality of pixels 12 arranged in an array of several thousand rows×several thousand columns like a general digital camera. Alternatively, the pixel unit 10 may be formed of a plurality of pixels 12 arranged in one row or one column. Alternatively, the pixel unit 10 may be formed of one pixel 12.

In each row of the pixel array of the pixel unit 10, a control line 14 is arranged so as to extend in a first direction (a lateral direction in FIG. 1). Each of the control lines 14 is connected to the pixels 12 aligned in the first direction, and forms a signal line common to these pixels 12. The first direction in which the control lines 14 extend may be referred to as a row direction or a horizontal direction. Each of the control lines 14 may include a plurality of signal lines for supplying a plurality of types of control signals to the pixels 12. The control lines 14 in each row are connected to the vertical scanning circuit unit 40.

In each row of the pixel array of the pixel unit 10, a data line 16 is arranged so as to extend in the first direction. Each of the data lines 16 is connected to the pixels 12 aligned in the first direction, and forms a signal line common to these pixels 12. Each of the data lines 16 may include a plurality of signal lines for transferring a digital signal of a plurality of bits output from the pixel 12 on a bit-by-bit basis. The data lines 16 in each row are connected to the readout circuit unit 50.

In each column of the pixel array of the pixel unit 10, a control line 18 is arranged so as to extend in a second direction (vertical direction in FIG. 1) intersecting the first direction. Each of the control lines 18 is connected to the pixels 12 aligned in the second direction, and forms a signal line common to these pixels 12. The second direction in which the control lines 18 extend may be referred to as a column direction or a vertical direction. Each of the control lines 18 may include a plurality of signal lines for supplying a plurality of types of control signals to the pixels 12. The control lines 18 in each row are connected to the horizontal scanning circuit unit 60.

The vertical scanning circuit unit 40 is a control unit having a function of receiving a control signal output from the control pulse generation unit 80, generating a control signal for driving the pixel 12, and supplying the control signal to the pixel 12 via the control line 14. A logic circuit such as a shift register or an address decoder may be used for the vertical scanning circuit unit 40. The vertical scanning circuit unit 40 sequentially supplies control signals to the pixels 12 of the pixel unit 10 row by row to thereby sequentially drive the pixels 12 of the pixel unit 10 row by row.

The horizontal scanning circuit unit 60 is a control unit having a function of receiving a control signal output from the control pulse generation unit 80, generating a control signal for driving the pixel 12, and supplying the control signal to the pixel 12 via the control line 18. A logic circuit such as a shift register or an address decoder may be used for the horizontal scanning circuit unit 60. The horizontal scanning circuit unit 60 sequentially scans the pixels 12 in the pixel unit 10 column by column to thereby output pixel signals held by the pixels 12 to the readout circuit unit 50 via the data lines 16.

The readout circuit unit 50 includes a plurality of determination circuits and a plurality of holding units (not illustrated) provided corresponding to each row of the pixel array of the pixel unit 10. The readout circuit unit 50 has a function of holding each of the pixel signals of the pixels 12 of each row output from the pixel unit 10 via the data lines 16 in units of columns in the holding unit of the corresponding row. The readout circuit unit 50 receives the control signal supplied from the control pulse generation unit 80 via the control line 58, and sequentially outputs the pixel signals held in the holding unit of each row to the output circuit unit 70.

The output circuit unit 70 has an external interface circuit and is a circuit unit configured to output the pixel signals output from the readout circuit unit 50 to the outside of the photoelectric conversion device 100. The external interface circuit included in the output circuit unit 70 is not particularly limited. As the external interface circuit, for example, SerDes (SERializer/DESerializer) transmission circuits such as LVDS (Low Voltage Differential Signaling) circuits and SLVS (Scalable Low Voltage Signaling) circuits may be applied.

The control pulse generation unit 80 is a control circuit configured to generate a control signal for controlling the operation and timing of the vertical scanning circuit unit 40, the readout circuit unit 50, and the horizontal scanning circuit unit 60, and supply the control signal to each functional block. At least a part of the control signals for controlling the operation and timing of the vertical scanning circuit unit 40, the readout circuit unit 50, and the horizontal scanning circuit unit 60 may be supplied from the outside of the photoelectric conversion device 100.

Note that the connection mode of each functional block of the photoelectric conversion device 100 is not limited to the configuration example illustrated in FIG. 1, and may be configured as illustrated in FIG. 2, for example.

In the configuration example of FIG. 2, the data line 16 extending in the second direction is arranged in each column of the pixel array of the pixel unit 10. Each of the data lines 16 is connected to the pixels 12 aligned in the second direction, and forms a signal line common to these pixels 12. The data lines 16 in each column are connected to the readout circuit unit 50.

The readout circuit unit 50 is a receiving circuit that receives the pixel signals output via the data lines 16, and has a function of holding each of the pixel signals of the pixels 12 of each column output from the pixel unit 10 via the data lines 16 in units of rows in the holding unit of the corresponding column. The readout circuit unit 50 includes a plurality of determination circuits and a plurality of holding units (not illustrated) provided corresponding to respective columns of the pixel array of the pixel unit 10.

The horizontal scanning circuit unit 60 receives the control signal output from the control pulse generation unit 80, generates a control signal for reading out the pixel signal from the holding unit of each column of the readout circuit unit 50, and supplies the control signal to the readout circuit unit 50. The horizontal scanning circuit unit 60 sequentially scans the holding units of the respective columns of the readout circuit unit 50, and sequentially outputs pixel signals held in the holding units to the output circuit unit 70.

Other functional blocks in the configuration example of FIG. 2 may be similar to those in the configuration example of FIG. 1.

As illustrated in FIG. 3, each of the plurality of pixels 12 includes a photoelectric conversion unit 20 and a pixel signal processing unit 30. The photoelectric conversion unit 20 includes a photon detection element 22 and a quenching element 24. The pixel signal processing unit 30 includes a waveform shaping circuit 32, a processing circuit 34, and a pixel output circuit 36.

The photon detection element 22 may be an avalanche photodiode (hereinafter referred to as "APD"). The anode of the APD constituting the photon detection element 22 is connected to a node to which a voltage VL is supplied. The cathode of the APD constituting the photon detection element 22 is connected to one terminal of the quenching element 24. A connection node between the photon detection element 22 and the quenching element 24 is an output node of the photoelectric conversion unit 20. The other terminal of the quenching element 24 is connected to a node to which a voltage VH higher than the voltage VL is supplied. The voltage VL and the voltage VH are set such that a reverse bias voltage sufficient for the APD to perform an avalanche multiplication operation is applied. In one example, a negative high voltage is applied as the voltage VL, and a positive voltage approximately equal to the power supply voltage is applied as the voltage VH. For example, the voltage VL is −30 V and the voltage VH is 1 V.

The photon detection element 22 may be comprised of an APD as described above. When a reverse bias voltage sufficient to perform the avalanche multiplication operation is supplied to the APD, charges generated by light incidence on the APD cause avalanche multiplication, and an avalanche current is generated. Operation modes in a state where a reverse bias voltage is supplied to the APD include a Geiger mode and a linear mode. The Geiger mode is an operation mode in which a voltage applied between the anode and the cathode is set to a reverse bias voltage higher than the breakdown voltage of the APD. The linear mode is an operation mode in which a voltage applied between the anode and the cathode is set to a reverse bias voltage close to or lower than the breakdown voltage of the APD. The APD operating in the Geiger mode is called SPAD (Single Photon Avalanche Diode). The APD constituting the photon detection element 22 may operate in a linear mode or in a Geiger mode. In particular, SPAD is preferable because the potential difference becomes large and the effect of withstand voltage becomes significant as compared with the linear mode APD.

The quenching element 24 has a function of converting a change in the avalanche current generated in the photon detection element 22 into a voltage signal. The quenching element 24 functions as a load circuit (quenching circuit) at the time of signal multiplication by avalanche multiplication, and has a function of reducing the voltage applied to the photon detection element 22 to suppress avalanche multiplication. The operation in which the quenching element 24 suppresses the avalanche multiplication is called a quenching operation. Further, the quenching element 24 has a function of returning the voltage supplied to the photon detection element 22 to the voltage VH by flowing the current corresponding to the voltage drop caused by the quenching operation. The operation in which the quenching element 24 returns the voltage supplied to the photon detection element 22 to the voltage VH is called a recharging operation. The quenching element 24 may be formed of a resistor, a MOS transistor, or the like.

The waveform shaping circuit 32 has an input node to which an output signal of the photoelectric conversion unit 20 is supplied and an output node. The waveform shaping circuit 32 has a function of converting an analog signal supplied from the photoelectric conversion unit 20 into a pulse signal. The waveform shaping circuit 32 may be configured by a logic circuit including an NOT circuit (inverter circuit), NOR circuit, NAND circuit, and the like. The output node of the waveform shaping circuit 32 is connected to the processing circuit 34.

The processing circuit 34 may include an input node to which an output signal of the waveform shaping circuit 32 is supplied, an input node connected to the control line 14, and an output node. The processing circuit 34 is a functional block that performs predetermined processing on the pulse signal output from the waveform shaping circuit 32, and an example thereof is a counter. In the case that the processing circuit 34 is a counter, the processing circuit 34 may have a function of counting pulses superimposed on a signal output from the waveform shaping circuit 32 and holding a count value as a counting result. The signal supplied from the vertical scanning circuit unit 40 to the processing circuit 34 via the control line 14 may include an enable signal for controlling the pulse counting period (exposure period), a reset signal for resetting the count value held by the processing circuit 34, and the like. The output node of the processing circuit 34 is connected to the data line 16 via the pixel output circuit 36.

The pixel output circuit 36 has a function of switching an electrical connection state (connection or disconnection) between the processing circuit 34 and the data line 16. The pixel output circuit 36 switches the connection state between the processing circuit 34 and the data line 16 in response to a control signal supplied from the horizontal scanning circuit unit 60 via the control line 18 (otherwise a control signal supplied from the vertical scanning circuit unit 40 via the control line 14 in the configuration example of FIG. 2). The pixel output circuit 36 may include a buffer circuit for outputting a signal.

The pixel 12 is typically a unit structure that outputs a pixel signal for forming an image. However, when the purpose is to perform, e.g., a distance measurement using a TOF (Time of Flight) method, the pixels 12 need not necessarily be a unit structure that outputs a pixel signal for forming an image. That is, the pixel 12 may be a unit structure that outputs a signal for measuring the time at which light reaches and the amount of light.

Note that one pixel signal processing unit 30 is not necessarily provided for each pixel 12, and one pixel signal processing unit 30 may be provided for a plurality of pixels 12. In this case, signal processing of the plurality of pixels 12 may be sequentially executed using one pixel signal processing unit 30.

The photoelectric conversion device 100 according to the present embodiment may be formed on one substrate, or may be formed as a stacked photoelectric conversion device in which a plurality of substrates is stacked. In the latter case, for example, as illustrated in FIG. 4, the photoelectric conversion device may be configured as a stacked-type photoelectric conversion device in which the sensor substrate 110 and the circuit substrate 120 are stacked and electrically connected. In the sensor substrate 110, at least the photon detection element 22 among the components of the pixel 12 may be arranged. Among the components of the pixel 12, the quenching element 24 and the pixel signal processing unit 30 may be arranged on the circuit substrate 120. The photon detection element 22, the quenching element 24, and the pixel signal processing unit 30 are electrically connected to each other via an interconnection provided for each pixel 12. The circuit substrate 120 may further include a vertical scanning circuit unit 40, a readout circuit unit 50, a horizontal scanning circuit unit 60, an output circuit unit 70, a control pulse generation unit 80, and the like.

The photon detection element 22, and the quenching element 24 and the pixel signal processing unit 30 of each pixel 12 are provided on the sensor substrate 110 and the circuit substrate 120, respectively so as to overlap each other in a plan view. The vertical scanning circuit unit 40, the readout circuit unit 50, the horizontal scanning circuit unit 60, the output circuit unit 70, and the control pulse generation unit 80 may be arranged around the pixel unit 10 including the plurality of pixels 12. In this specification, "plan view" refers to viewing from a direction perpendicular to the light incident surface of the sensor substrate 110.

By configuring the stacked-type photoelectric conversion device 100, integration degree of the elements may be increased and high functions may be achieved. In particular, by arranging the photon detection element 22, and the quenching element 24 and the pixel signal processing unit 30 on different substrates, the photon detection elements 22 may be arranged at high density without sacrificing the light receiving area of the photon detection element 22, and the photon detection efficiency may be improved.

Note that the number of substrates constituting the photoelectric conversion device 100 is not limited to two, and the photoelectric conversion device 100 may be formed by stacking three or more substrates.

Although a chip diced is assumed as the sensor substrate 110 and the circuit substrate 120 in FIG. 4, the sensor substrate 110 and the circuit substrate 120 are not limited to the chip. For example, each of the sensor substrate 110 and the circuit substrate 120 may be a wafer. In addition, the sensor substrate 110 and the circuit substrate 120 may be diced after being stacked in a wafer state, or may be stacked and bonded after being formed into chips.

FIG. 5A to FIG. 5C illustrate basic operations of the photoelectric conversion unit 20 and the waveform shaping circuit 32. FIG. 5A is a circuit diagram of the photoelectric conversion unit 20 and the waveform shaping circuit 32, FIG. 5B illustrates a waveform of a signal at an input node (node A) of the waveform shaping circuit 32, and FIG. 5C illustrates a waveform of a signal at an output node (node B) of the waveform shaping circuit 32.

At time t0, a reverse bias voltage having a potential difference corresponding to (VH-VL) is applied to the photon detection element 22. Although a reverse bias voltage sufficient to cause avalanche multiplication is applied between the anode and the cathode of the APD constituting the photon detection element 22, no carrier is present as a seed of avalanche multiplication in a state where photons are not incident on the photon detection element 22. Therefore, avalanche multiplication does not occur in the photon detection element 22, and no current flows in the photon detection element 22.

At subsequent time t1, it is assumed that a photon is incident on the photon detection element 22. When the photon enters the photon detection element 22, electron-hole pair is generated by photoelectric conversion, and avalanche multiplication occurs using these carriers as seeds, and an avalanche multiplication current flows through the photon detection element 22. When the avalanche multiplication current flows through the quenching element 24, a voltage drop is caused by the quenching element 24, and the voltage of the node A begins to drop. When the voltage drop amount of the node A increases and the avalanche multiplication is stopped at time t3, the voltage level of the node A does not drop further.

When the avalanche multiplication in the photon detection element 22 is stopped, a current that compensates for the voltage drop flows from the node to which the voltage VL is supplied to the node A via the photon detection element 22, and the voltage of the node A gradually increases. Thereafter, at time t5, the node A is settled to the original voltage level.

The waveform shaping circuit 32 binarizes the signal input from the node A in accordance with a predetermined determination threshold value, and outputs the binarized signal from the node B. More specifically, the waveform shaping circuit 32 outputs a Low-level signal from the node B when the voltage level of the node A exceeds the determination threshold value, and outputs a High-level signal from the node B when the voltage level of the node A is equal to or lower than the determination threshold value. For example, as illustrated in FIG. 5B, it is assumed that the voltage of the node A is equal to or lower than the determination threshold value during a period from time t2 to time t4. In this case, as illustrated in FIG. 5C, the signal level at the node B becomes Low-level during the period from time t0 to time t2 and the period from time t4 to time t5, and becomes High-level during the period from time t2 to time t4.

Thus, the analog signal input from the node A is shaped into a digital signal by the waveform shaping circuit 32. A pulse signal output from the waveform shaping circuit 32 in response to incidence of photon on the photon detection element 22 is a photon detection pulse signal.

When the processing circuit 34 constitutes a counter, the processing circuit 34 counts the photon detection pulse signal output from the waveform shaping circuit 32 in this manner, and holds the count value as a digital signal. The pixel output circuit 36 outputs a digital signal (pixel signal) held by the processing circuit 34 to the data line 16 in response to a control signal supplied from the horizontal scanning circuit unit 60 via the control line 18.

FIG. 6 is a diagram schematically illustrating a connection between the pixel unit 10 and the readout circuit unit 50. FIG. 6 illustrates a connection relationship when the configuration example of FIG. 1 is assumed. In the case of the configuration example of FIG. 2, the rows and columns are replaced with each other, but they are basically the same, and a description thereof will be omitted here.

As described above, the plurality of pixels 12 is arranged in the pixel unit 10 so as to form a plurality of rows and a plurality of columns. Although FIG. 6 illustrates an internal circuit only for the upper left pixel 12 for simplification of the drawing, the same applies to other pixels 12. Each row of the pixel array is provided with data lines 16 arranged in the row direction. Although FIG. 6 illustrates one signal line in each row as the data line 16, the pixel signal output from the pixel 12 is a digital signal, and the data line 16 in each row includes a plurality of signal lines corresponding to the number of bits of the pixel signal.

The readout circuit unit 50 may include a reset circuit 52 and a determination circuit 54 connected to each of the data lines 16. Although not illustrated in FIG. 6, the readout circuit unit 50 includes a plurality of reset circuits 52 and a plurality of determination circuits 54 corresponding to the number of bits of the pixel signal, corresponding to each row of the pixel array. A memory (not illustrated) for holding "0" or "1" information corresponding to the result of the determination by the determination circuit 54 is provided in a subsequent stage of the determination circuit 54.

FIG. 7 is a circuit diagram illustrating a configuration example of the pixel output circuit 36 and the reset circuit 52. The pixel output circuit 36 may be configured by an open drain buffer circuit having n-channel transistors MN11 and MN12, for example, as illustrated in FIG. 7. Further, the reset circuit 52 may be constituted by a p-channel transistor MP21.

The gate of the n-channel transistor MN11 is connected to the output node of the processing circuit 34. The source of the n-channel transistor MN11 is connected to the reference voltage node. The drain of the n-channel transistor MN11 is connected to the source of the n-channel transistor MN12. The drain of the n-channel transistor MN12 is connected to the data line 16. The gate of the n-channel transistor MN12 is connected to the control line 18. The control signal P_SEL is supplied from the horizontal scanning circuit unit 60 to the gate of the n-channel transistor MN12 via the control line 18. The source of the p-channel transistor MP21 is connected to a power supply voltage node (voltage Vdd). The drain of the p-channel transistor MP21 is connected to the data line 16. The gate of the p-channel transistor MP21 is connected to the control line 58. The control pulse generation unit 80 supplies a control signal P_RES to the gate of the p-channel transistor MP21 via the control line 58. The capacitor Cp connected to the data line 16 represents the interconnection parasitic capacitor coupled to the data line 16.

Next, a pixel signal readout operation in the pixel output circuit 36 and the reset circuit 52 will be described with reference to FIG. 7.

First, a control signal P_RES of a Low-level is supplied from the control pulse generation unit 80 via the control line 58 to turn on the p-channel transistor MP21. Thereby, the data line 16 is connected to the power supply voltage node via the p-channel transistor MP21, and the voltage Vdd is charged in the interconnection parasitic capacitor Cp. That is, the data line 16 is reset to the voltage Vdd.

Next, the control signal P_SEL of High-level is supplied from the horizontal scanning circuit unit 60 via the control line 18 to turn on the n-channel transistor MN12. Thus, the drain of the n-channel transistor MN11 is connected to the data line 16 via the n-channel transistor MN12.

Next, the output signal of the processing circuit 34 (pixel signal held by the processing circuit 34) is supplied to the gate of the n-channel transistor MN11. Thus, the n-channel transistor MN11 is turned on or off in accordance with the level of the output signal of the processing circuit 34. The n-channel transistor MN12 may be turned on after the output signal of the processing circuit 34 is supplied to the gate of the n-channel transistor MN11.

At this time, when the n-channel transistor MN11 is in an off-state, the voltage of the data line 16 is maintained at the voltage Vdd. On the other hand, when the n-channel transistor MN11 is in an on-state, charges accumulated in the interconnection parasitic capacitor Cp are drawn through the n-channel transistors MN12 and MN11, and the voltage of the data line 16 drops to the reference voltage.

Next, after a predetermined time has elapsed, the determination circuit 54 detects the voltage level of the data line 16. The determination circuit 54 outputs a Low-level signal when the voltage of the data line 16 is the voltage Vdd, and outputs a High-level signal when the voltage of the data line 16 is lower than the voltage Vdd. In this way, the pixel signal readout operation from the pixel 12 is executed.

Here, characteristics suitable for the MOS transistors constituting the pixel output circuit 36 and the reset circuit 52 will be described.

Typical characteristics required for MOS transistors include small off-state leakage current and high driving power. The off-state leakage current (also referred to as a sub-threshold leakage current) is a current flowing between the source and the drain in a voltage region (sub-threshold region) in which the gate voltage of the MOS transistor is less than the threshold voltage. A small off-state leakage current means a small standby current, which can contribute to a reduction in power consumption. A high driving power means a low ON-resistance and a large ON-current, which can contribute to high-speed operation.

However, these characteristics are in a trade-off relationship, and it is difficult to achieve both. For example, a threshold voltage is one of parameters related to an off-state leakage current and a driving power. When the threshold voltage is lowered, the driving power may be improved, but the off-state leakage current increases. Conversely, when the threshold voltage is increased, the off-state leakage current may be reduced, but the driving power decreases. Therefore, it is desirable to design the transistors included in the circuits of the respective portions of the photoelectric conversion device 100 focusing on particularly important characteristics required for the respective circuits.

The pixel output circuit 36 has a function to converge the voltage of the data line 16 to one of the power supply voltage and the reference voltage in accordance with the output signal of the processing circuit 34. Here, since a plurality of pixels 12 corresponding to the number of columns or rows, that is, a large number of transistors are connected to the data line 16, the parasitic capacitance coupled to the data line 16 is large. The data line 16 has a long interconnection length and a large parasitic resistance. Therefore, the pixel output circuit 36 is required to be constituted by a transistor having a high driving power capable of driving a signal on the high load interconnection. Therefore, the transistor of the pixel output circuit 36 preferably reduces the threshold voltage and improves the driving power.

The transistors constituting the processing circuit 34 and the pixel output circuit 36 are formed of minute MOS transistors from the viewpoint of high performance and high functionality. Therefore, an increase in the off-state leakage current caused by decreasing the threshold voltage of the transistors of the n-channel transistors MN11 and MN12 is inevitable. However, the current flowing through the n-channel transistors MN11 and MN12 is a current flowing from the power supply voltage node to these transistors via the p-channel transistor MP21 and the data line 16. In other words, each of the n-channel transistors MN11 and MN12 and the p-channel transistor MP21 forms a part of an electrical path from the power supply voltage node to the reference voltage node via the data line 16. That is, the off-state leakage current flowing through the n-channel transistors MN11 and MN12 is the same as the off-state leakage current of the transistor having the smallest off-state leakage current among the n-channel transistors MN11 and MN12 and the p-channel transistor MP21. Therefore, if the p-channel transistor MP21 is formed of a transistor with a small off-state leakage current, even if the n-channel transistors MN11 and MN12 are formed of a transistor with a large off-state leakage current, the off-state leakage current flowing as a result may be reduced.

From this viewpoint, the transistor (p-channel transistor MP21) included in the reset circuit 52 preferably has a smaller off-state leakage current than the transistors (n-channel transistors MN11 and MN12) included in the pixel output circuit 36. In other words, the absolute value of the threshold voltage of the transistor (p-channel transistor MP21) included in the reset circuit 52 is preferably larger than the absolute value of the threshold voltage of the transistors (n-channel transistors MN11 and MN12) included in the pixel output circuit 36.

The reset circuit 52 has a function of resetting the potential of the data line 16 to the power supply voltage. Therefore, the reset circuit 52 is preferably formed of a transistor having a high driving power capable of driving a high-load interconnection, similar to the transistors included in the pixel output circuit 36. When a high driving power is required by the reset circuit 52, the driving power may be increased by increasing the element size (gate width) of the transistors constituting the reset circuit 52. Since the integration degree in the reset circuit 52 is lower than the integration degree in the pixel unit 10, the size of the transistors constituting the reset circuit 52 may be increased to ensure the driving power, and thus the influence on the circuit scale is small. Therefore, with this configuration, the driving power of the transistors constituting the reset circuit 52 may be improved while reducing the off-state leakage current.

The method of making the threshold voltage of the transistor of the reset circuit 52 higher than the threshold voltage of the transistor of the pixel output circuit 36 is not particularly limited, and may be realized by any of the following methods or a combination of these methods, for example.

Figure 8A:
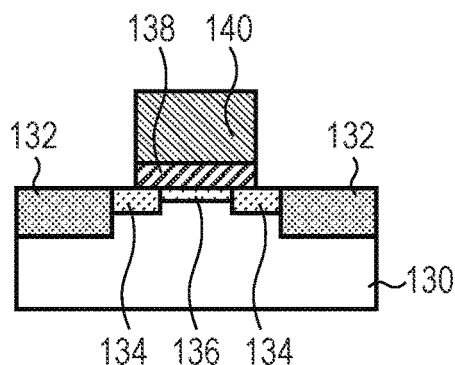
FIG. 8A, FIG. 8B, FIG. 8C, FIG. 8D, FIG. 8E, and FIG. 8F are cross-sectional views illustrating a method of controlling the threshold voltage of a MOS transistor.

FIG. 8A is a schematic diagram illustrating a configuration example of a transistor constituting the pixel output circuit 36. FIG. 8B to FIG. 8F are schematic diagrams illustrating a configuration example of a transistor constituting the reset circuit 52. Each transistor illustrated in FIG. 8A to FIG. 8F includes source/drain regions 132 provided in a surface portion of a well 130, extension regions 134 (LDD regions), and a channel doping layer 136. Each transistor includes a gate insulating film 138 provided over the well 130 and a gate electrode 140 provided over the gate insulating film 138. Note that the well 130 has a conductivity type opposite to the conductivity type of the transistor. That is, an n-channel transistor is formed in the p-type well 130, and a p-channel transistor is formed in the n-type well 130. Further, the channel doping layer 136 is a region to which an impurity of the same conductivity type as the conductivity type of the transistor is added. That is, the channel doping layer 136 is a region to which an n-type impurity is added in the case of an n-channel transistor, and is a region to which a p-type impurity is added in the case of a p-channel transistor. Alternatively, an impurity of a conductivity type opposite to the conductivity type of the transistor may be added. That is, the channel doping layer 136 may be a region to which a p-type impurity is added in the case of an n-channel transistor, and may be a region to which an n-type impurity is added in the case of a p-channel transistor. At this time, the threshold voltage becomes lower as the impurity concentration of the same conductivity type as the conductivity type of the transistor becomes higher, and the threshold voltage becomes lower as the impurity concentration of the conductivity type opposite to the conductivity type of the transistor becomes lower. Although each transistor includes the extension regions 134 and the channel doping layer 136 in FIG. 8A to FIG. 8F, these structures are not essential. For example, in a transistor which does not include the extension regions 134 and the channel doping layer 136, the threshold voltage may be changed by changing the thickness of the gate insulating film 138.

Figure 8B:
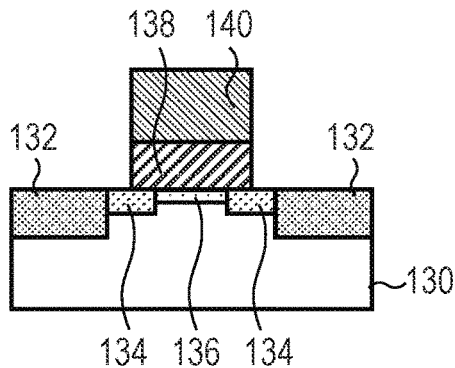
Figure 8C:
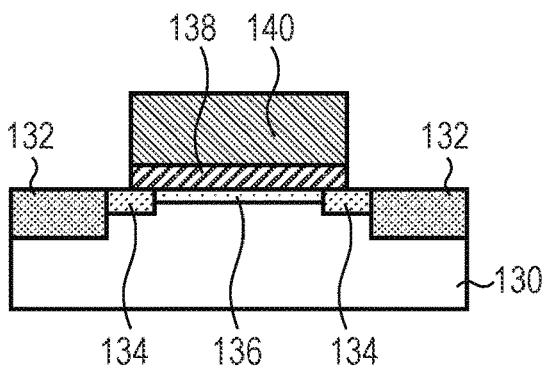
Figure 8D:
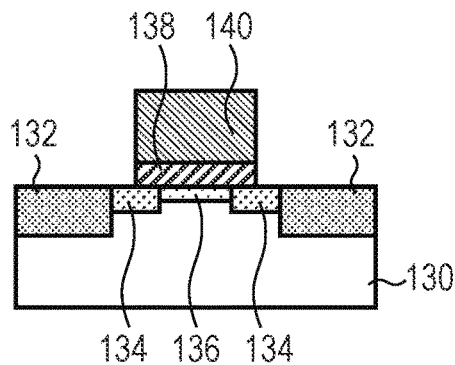
Figure 8E:
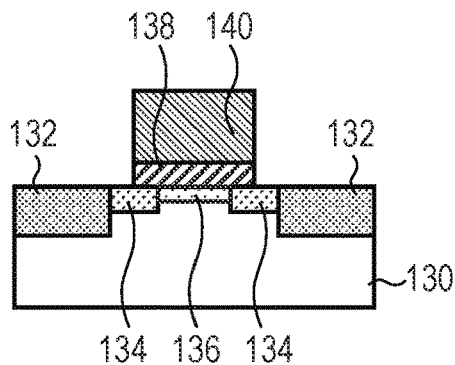
Figure 8F:
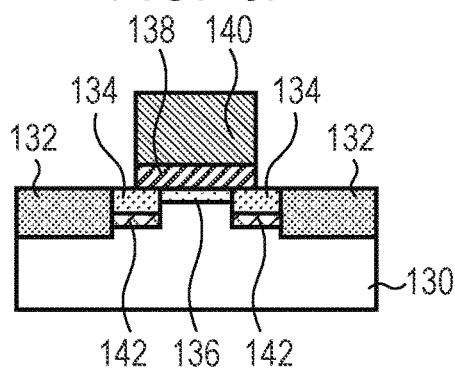

In the transistor in FIG. 8B, the gate insulating film 138 is thicker than the transistor in FIG. 8A. Other points are similar to those of the transistor in FIG. 8A. In the transistor illustrated in FIG. 8C, the gate length is longer than that of the transistor in FIG. 8A. Other points are similar to those of the transistor in FIG. 8A. In the transistor illustrated in FIG. 8D, the concentration of the extension regions 134 is lower than that of the transistor illustrated in FIG. 8A. Other points are similar to those of the transistor in FIG. 8A. In the transistor illustrated in FIG. 8E, the impurity concentration of an impurity of the same conductivity type as the transistor in the channel region (the impurity concentration of the channel doping layer 136) is lower than that in the transistor illustrated in FIG. 8A. Alternatively, the impurity concentration in the channel region of the impurity of the conductivity type opposite to the conductivity type of the transistor is set higher than that in the case of the transistor in FIG. 8A. Other points are similar to those of the transistor in FIG. 8A. In the transistor illustrated in FIG. 8F, a halo implantation layer 142 having a conductivity type opposite to that of the source/drain regions 132 and the extension regions 134 is provided deeper than the extension regions 134 in the transistor illustrated in FIG. 8A. Other points are similar to those of the transistor in FIG. 8A. In any of the structures illustrated in FIG. 8B to FIG. 8F, the threshold voltage of the transistor is higher than that of the transistor illustrated in FIG. 8A.

In addition, it is desirable that transistors constituting other functional blocks of the pixel unit 10 and the readout circuit unit 50 be designed as appropriate in accordance with characteristics required for them.

The processing circuit 34 is required to have a high integration degree from the viewpoint of reducing the pixel size and increasing the functionality, but the driving power is not required. Therefore, the processing circuit 34 is preferably formed of a transistor with a small off-state leakage current from the viewpoint of reducing power consumption. As compared with the pixel output circuit 36, the transistor included in the processing circuit 34 preferably has a smaller off-state leakage current than the transistor included in the pixel output circuit 36. In other words, the absolute value of the threshold voltage of the transistors constituting the processing circuit 34 is preferably larger than the absolute value of the threshold voltage of the transistors constituting the pixel output circuit 36.

The determination circuit 54 is a circuit for determining the potential level of the data line 16, and the driving power required for the pixel output circuit 36 and the reset circuit 52 is not required. Therefore, the determination circuit 54 is preferably formed of a transistor with a small off-state leakage current from the viewpoint of reducing power consumption. As compared with the pixel output circuit 36, the transistor included in the determination circuit 54 preferably has a smaller off-state leakage current than the transistor included in the pixel output circuit 36. In other words, the absolute value of the threshold voltage of the transistor included in the determination circuit 54 is preferably larger than the absolute value of the threshold voltage of the transistor included in the pixel output circuit 36. Since the integration degree of the determination circuit 54 is lower than that of the pixel unit 10, the transistor included in the determination circuit 54 may have a large element size.

Since a voltage higher than the voltage Vdd is applied to the waveform shaping circuit 32, the waveform shaping circuit 32 is constituted by a transistor having a higher withstand voltage than the transistors constituting the processing circuit 34, the pixel output circuit 36, and the readout circuit unit 50. The high withstand voltage transistor may be a transistor having a gate insulating film thicker than the transistors constituting the processing circuit 34, the pixel output circuit 36, and the readout circuit unit 50. When the quenching element 24 is formed of a transistor, like the waveform shaping circuit 32, the quenching element 24 is formed of a transistor having a higher withstand voltage than the transistors constituting the processing circuit 34, the pixel output circuit 36, and the readout circuit unit 50.

The waveform shaping circuit 32 and the quenching element 24 are preferably configured by a transistor having a smaller off-state leakage current than the transistor constituting the processing circuit 34 when voltage design is performed on the quenching element 24 side without taking a voltage margin. Further, in the case of the design in which the integration degree of the processing circuit 34 is maximized, the processing circuit 34 is preferably formed of a transistor having a smaller off-state leakage current than the transistor constituting the waveform shaping circuit 32 and the quenching element 24.

In addition, the vertical scanning circuit unit 40, the horizontal scanning circuit unit 60, the output circuit unit 70, and the control pulse generation unit 80 are preferably configured by transistors with a small off-state leakage current from the viewpoint of reducing power consumption. As compared with the pixel output circuit 36, the transistors constituting the vertical scanning circuit unit 40, the horizontal scanning circuit unit 60, the output circuit unit 70, and the control pulse generation unit 80 preferably have a smaller off-state leakage current than the transistor constituting the pixel output circuit 36.

As described above, according to the present embodiment, it is possible to realize high functionality and low power consumption of the photoelectric conversion device.

Second Embodiment

A photoelectric conversion device according to a second embodiment will be described with reference to FIG. 9. The same components as those of the photoelectric conversion device according to the first embodiment are denoted by the same reference numerals, and the description thereof will be omitted or simplified.

The pixel output circuit 36 and the reset circuit 52 are not limited to the configurations described in the first embodiment. In the present embodiment, a photoelectric conversion device in which the pixel output circuit 36 is configured by an open drain buffer circuit that outputs a differential signal will be described.

Figure 9:
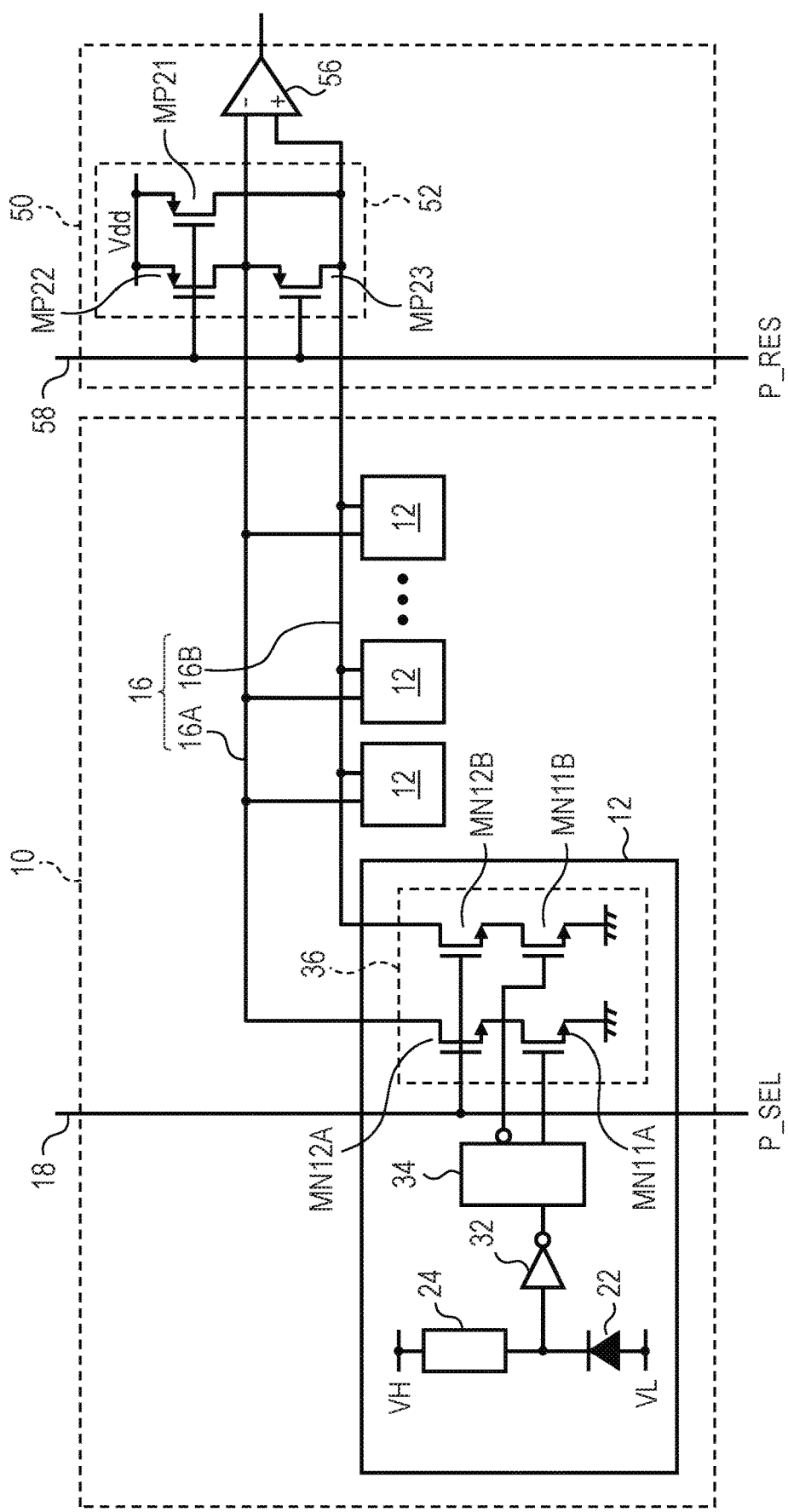
FIG. 9 is a circuit diagram illustrating a configuration example of a pixel output circuit and a reset circuit in a photoelectric conversion device according to a second embodiment.

FIG. 9 is a circuit diagram illustrating a configuration example of the pixel output circuit 36 and the reset circuit 52 in the photoelectric conversion device according to the present embodiment. In the present embodiment, the processing circuit 34 has a non-inverted signal output node that outputs a non-inverted signal and an inverted signal output node that outputs an inverted signal. The pixel output circuit 36 includes an open drain buffer circuit including n-channel transistors MN11A, MN12A, MN11B, and MN12B. The reset circuit 52 includes p-channel transistors MP21, MP22, and MP23. The data line 16 has a pair of data lines 16A and 16B. The determination circuit 54 in the first embodiment includes a differential amplifier circuit 56.

The gate of the n-channel transistor MN11A is connected to a non-inverted signal output node of the processing circuit 34. The source of the n-channel transistor MN11A is connected to the reference voltage node. The drain of the n-channel transistor MN11A is connected to the source of the n-channel transistor MN12A. The drain of the n-channel transistor MN12A is connected to the data line 16A. The gate of the n-channel transistor MN12A is connected to the control line 18. A control signal P_SEL is supplied from the horizontal scanning circuit unit 60 to the gate of the n-channel transistor MN12A via the control line 18.

Similarly, the gate of the n-channel transistor MN11B is connected to the inverted signal output node of the processing circuit 34. The source of the n-channel transistor MN11B is connected to the reference voltage node. The drain of the n-channel transistor MN11B is connected to the source of the n-channel transistor MN12B. The drain of the n-channel transistor MN12B is connected to the data line 16B. The gate of the n-channel transistor MN12B is connected to the control line 18. A control signal P_SEL is supplied from the horizontal scanning circuit unit 60 to the gate of the n-channel transistor MN12B via the control line 18.

The source of the p-channel transistor MP21 and the source of the p-channel transistor MP22 are connected to a power supply voltage node (voltage Vdd). The drain of the p-channel transistor MP21 is connected to the data line 16B. The drain of the p-channel transistor MP22 is connected to the data line 16A. The source of the p-channel transistor MP23 is connected to the data line 16A. The drain of the p-channel transistor MP23 is connected to the data line 16B. Gates of the p-channel transistors MP21, MP22, and MP23 are connected to the control line 58. The gates of the p-channel transistors MP21, MP22, and MP23 are supplied with the control signal P_RES from the control pulse generation unit 80 via the control line 58. The reset circuit 52 may include at least two of the p-channel transistors MP21, MP22, and MP23.

The data line 16A is connected to an inverting input node of the differential amplifier circuit 56. The data line 16B is connected to a non-inverting input node of the differential amplifier circuit 56.

Next, a pixel signal readout operation in the pixel output circuit 36 and the reset circuit 52 will be described with reference to FIG. 9.

First, a control signal P_RES of a Low-level is supplied from the control pulse generation unit 80 via the control line 58 to turn on the p-channel transistors MP21, MP22, and MP23. Thus, the data lines 16A and 16B are connected to the power supply voltage node via the p-channel transistors MP21, MP22, and MP23, and the interconnection parasitic capacitors of the data lines 16A and 16B are charged with the voltage Vdd. That is, the data lines 16A and 16B are reset to the voltage Vdd.

Next, the control signal P_SEL of High-level is supplied from the horizontal scanning circuit unit 60 via the control line 18 to turn on the n-channel transistors MN12A and MN12B. Thus, the drain of the n-channel transistor MN11A is connected to the data line 16A via the n-channel transistor MN12A, and the drain of the n-channel transistor MN11B is connected to the data line 16B via the n-channel transistor MN12B.

Next, the output signal of the processing circuit 34 is supplied to the gates of the n-channel transistors MN11A and MN11B. Thus, the n-channel transistors MN11A and MN11B are turned on or off in accordance with the level of the output signal of the processing circuit 34. The n-channel transistors MN12A and MN12B may be turned on after the output signal of the processing circuit 34 is supplied to the gates of the n-channel transistors MN11A and MN11B.

At this time, when the n-channel transistor MN11A is in an off-state and the n-channel transistor MN11B is in an on-state, the voltage of the data line 16A is maintained at the voltage Vdd, and the voltage of the data line 16B drops to the reference voltage. On the other hand, when the n-channel transistor MN11A is in an on-state and the n-channel transistor MN11B is in an off-state, the voltage of the data line 16A drops to the reference voltage, and the voltage of the data line 16B is maintained at the voltage Vdd.

Next, after a predetermined time has elapsed, the differential amplifier circuit 56 detects the voltage levels of the data lines 16A and 16B. The differential amplifier circuit 56 outputs a High-level signal when the voltage of the data line 16B is higher than the voltage of the data line 16A, and outputs a Low-level signal when the voltage of the data line 16A is higher than the voltage of the data line 16B.

The characteristics suitable for the MOS transistors constituting the pixel output circuit 36 and the reset circuit 52 are the same as those in the first embodiment. In other words, the off-state leakage current of the transistors included in the reset circuit 52 is preferably smaller than that of the transistors included in the pixel output circuit 36. In comparison with the threshold voltage of the transistor, the absolute value of the threshold voltage of the transistors constituting the reset circuit 52 is preferably higher than the absolute value of the threshold voltage of the transistors constituting the pixel output circuit 36. The transistors constituting the reset circuit 52 include p-channel transistors MP21, MP22, and MP23. The transistors constituting the pixel output circuit 36 include n-channel transistors MN11A, MN12A, MN11B, and MN12B.

The transistors constituting the other functional blocks of the photoelectric conversion device 100 are the same as those in the first embodiment. For example, transistors constituting the processing circuit 34 and the differential amplifier circuit 56 preferably have a smaller off-state leakage current than transistors constituting the pixel output circuit 36. In comparison with the threshold voltages of the transistors, the absolute values of the threshold voltages of the transistors constituting the processing circuit 34 and the differential amplifier circuit 56 are preferably higher than the absolute values of the threshold voltages of the transistors constituting the pixel output circuit 36. Since the integration degree of the differential amplifier circuit 56 is lower than that of the pixel unit 10, the transistor constituting the differential amplifier circuit 56 may have a large element size. The transistors constituting the quenching element 24 and the waveform shaping circuit 32 are preferably configured by transistors having higher withstand voltage than the transistors constituting the processing circuit 34, the pixel output circuit 36, and the readout circuit unit 50.

As described above, according to the present embodiment, it is possible to realize high functionality and low power consumption of the photoelectric conversion device.

Third Embodiment

Figure 10:
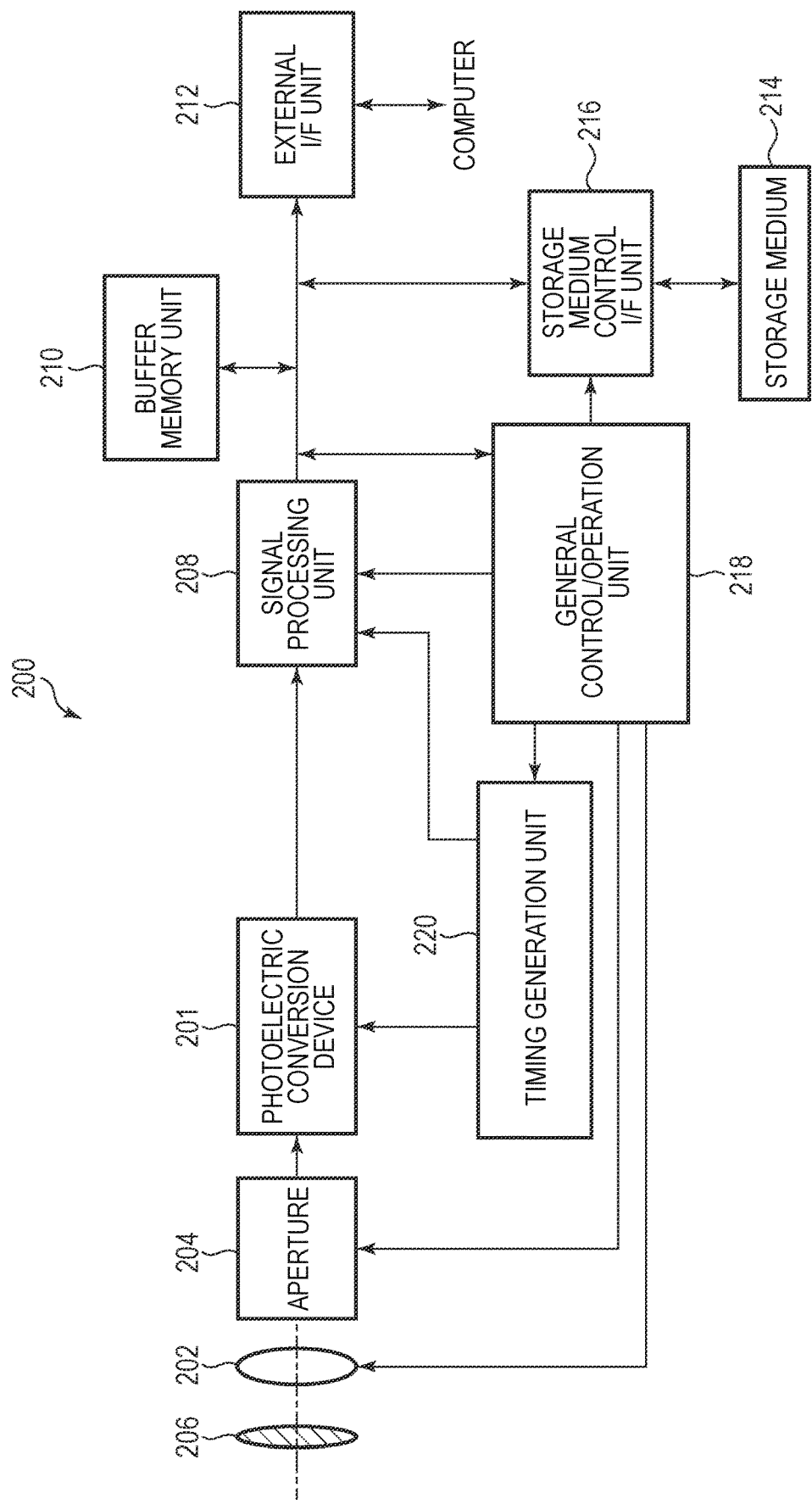
FIG. 10 is a block diagram illustrating a schematic configuration of a photodetection system according to a third embodiment.

A photodetection system according to a third embodiment will be described with reference to FIG. 10. FIG. 10 is a block diagram illustrating a schematic configuration of the photodetection system according to the present embodiment. In the present embodiment, a photodetection sensor to which the photoelectric conversion device 100 according to the first or the second embodiment is applied will be described.

The photoelectric conversion device 100 described in the first and second embodiments is applicable to various photodetection systems. Examples of applicable photodetection systems include imaging systems such as digital still cameras, digital camcorders, surveillance cameras, copiers, facsimiles, cellular phones, in-vehicle cameras, and observation satellites. A camera module including an optical system such as a lens and an imaging device is also included in the photodetection system. FIG. 10 illustrates a block diagram of a digital still camera as an example of them.

The photodetection system 200 illustrated in FIG. 10 includes a photoelectric conversion device 201, a lens 202 for forming an optical image of an object onto the photoelectric conversion device 201, an aperture 204 for varying the amount of light passing through the lens 202, and a barrier 206 for protecting the lens 202. The lens 202 and the aperture 204 are optical systems for focusing light on the photoelectric conversion device 201. The photoelectric conversion device 201 is the photoelectric conversion device 100 described in any of the first and second embodiments, and converts an optical image formed by the lens 202 into image data.

The photodetection system 200 also includes a signal processing unit 208 that processes an output signal output from the photoelectric conversion device 201. The signal processing unit 208 generates image data from the digital signal output from the photoelectric conversion device 201. The signal processing unit 208 performs various types of correction and compression as necessary to output image data. The photoelectric conversion device 201 may include an AD conversion unit that generates a digital signal to be processed by the signal processing unit 208. The AD conversion unit may be formed on a semiconductor layer (semiconductor substrate) on which the photon detection element of the photoelectric conversion device 201 is formed, or may be formed on a semiconductor substrate different from the semiconductor layer on which the photon detection element of the photoelectric conversion device 201 is formed. The signal processing unit 208 may be formed on the same semiconductor substrate as the photoelectric conversion device 201.

The photodetection system 200 further includes a buffer memory unit 210 for temporarily storing image data, and an external interface unit (external I/F unit) 212 for communicating with an external computer or the like. The photodetection system 200 further includes a storage medium 214 such as a semiconductor memory for storing or read image data, and a storage medium control interface unit (recording medium control I/F unit) 216 for storing or reading out image data on or from the storage medium 214. The storage medium 214 may be built in the photodetection system 200 or may be detachable. Communication between the storage medium control I/F unit 216 and the storage medium 214 and communication from the external I/F unit 212 may be performed wirelessly.

The photodetection system 200 further includes a general control/operation unit 218 that controls various calculations and the entire digital still camera, and a timing generation unit 220 that outputs various timing signals to the photoelectric conversion device 201 and the signal processing unit 208. Here, the timing signal or the like may be input from the outside, and the photodetection system 200 may include at least the photoelectric conversion device 201 and the signal processing unit 208 that processes the output signal output from the photoelectric conversion device 201. The timing generation unit 220 may be mounted on the photoelectric conversion device 201. The general control/operation unit 218 and the timing generation unit 220 may be configured to perform part or all of the control functions of the photoelectric conversion device 201.

The photoelectric conversion device 201 outputs an imaging signal to the signal processing unit 208. The signal processing unit 208 performs predetermined signal processing on the imaging signal output from the photoelectric conversion device 201, and outputs image data. The signal processing unit 208 generates an image using the imaging signal. The signal processing unit 208 may be configured to perform distance measurement calculation on a signal output from the photoelectric conversion device 201.

As described above, according to the present embodiment, by configuring the photodetection system using the photoelectric conversion devices of the first and second embodiments, it is possible to realize a photodetection system capable of acquiring images of higher quality.

Fourth Embodiment

Figure 11:
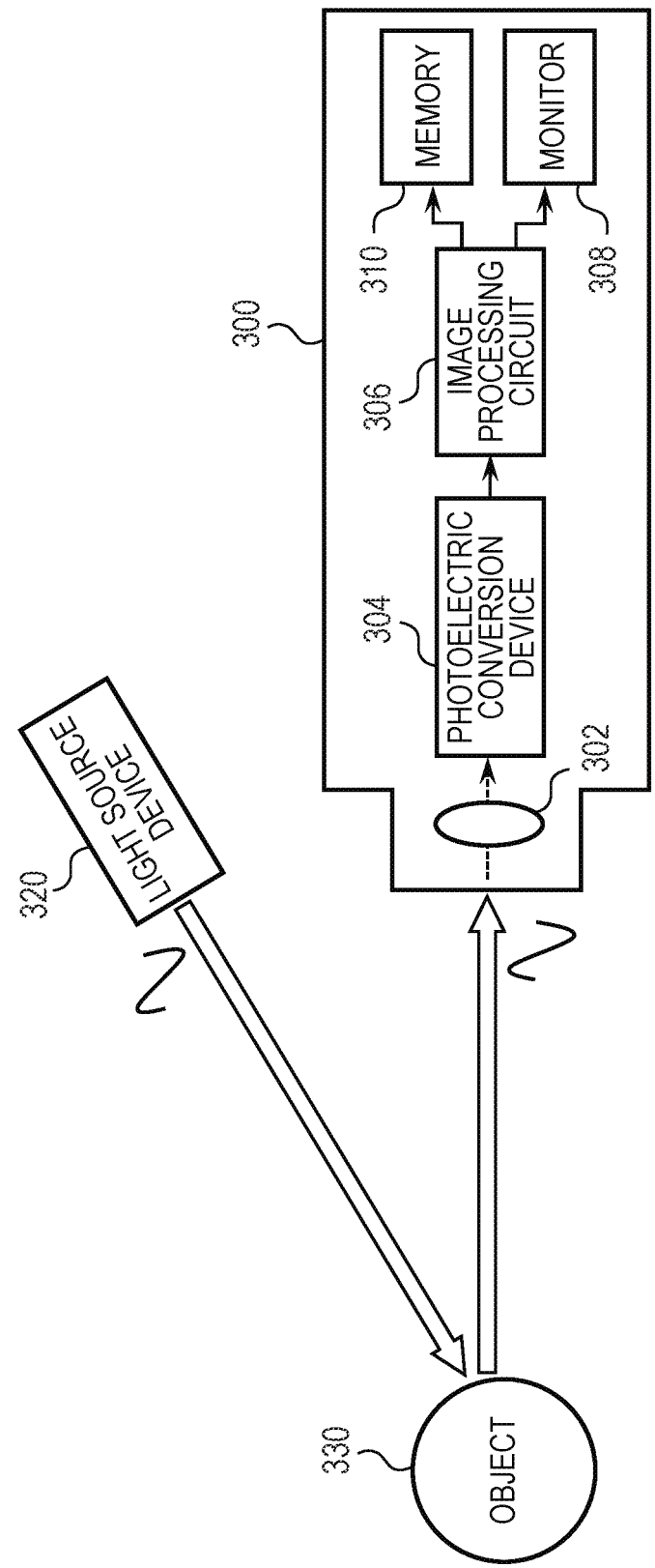
FIG. 11 is a block diagram illustrating a schematic configuration of a range image sensor according to a fourth embodiment.

A range image sensor according to a fourth embodiment will be described with reference to FIG. 11. FIG. 11 is a block diagram illustrating a schematic configuration of the range image sensor according to the present embodiment. In the present embodiment, a range image sensor will be described as an example of a photodetection system to which the photoelectric conversion device 100 according to the first or the second embodiment is applied.

As illustrated in FIG. 11, the range image sensor 300 according to the present embodiment may include an optical system 302, a photoelectric conversion device 304, an image processing circuit 306, a monitor 308, and a memory 310. The range image sensor 300 receives light (modulated light or pulsed light) emitted from the light source device 320 toward an object 330 and reflected by the surface of the object 330, and acquires a distance image corresponding to the distance to the object 330.

The optical system 302 includes one or a plurality of lenses, and has a role of forming an image of image light (incident light) from the object 330 onto a light receiving surface (sensor unit) of the photoelectric conversion device 304.

The photoelectric conversion device 304 is the photoelectric conversion device 100 described in any of the first and second embodiments, and has a function of generating a distance signal indicating a distance to the object 330 based on image light from the object 330 and supplying the generated distance signal to the image processing circuit 306.

The image processing circuit 306 has a function of performing image processing for constructing a distance image based on the distance signal supplied from the photoelectric conversion device 304.

The monitor 308 has a function of displaying a distance image (image data) obtained by image processing in the image processing circuit 306. The memory 310 has a function of storing (recording) a distance image (image data) obtained by image processing in the image processing circuit 306.

As described above, according to the present embodiment, by configuring the range image sensor using the photoelectric conversion devices of the first or the second embodiment, it is possible to realize a range image sensor capable of acquiring a distance image including more accurate distance information together with improvement in characteristics of the pixel 12.

Fifth Embodiment

Figure 12:
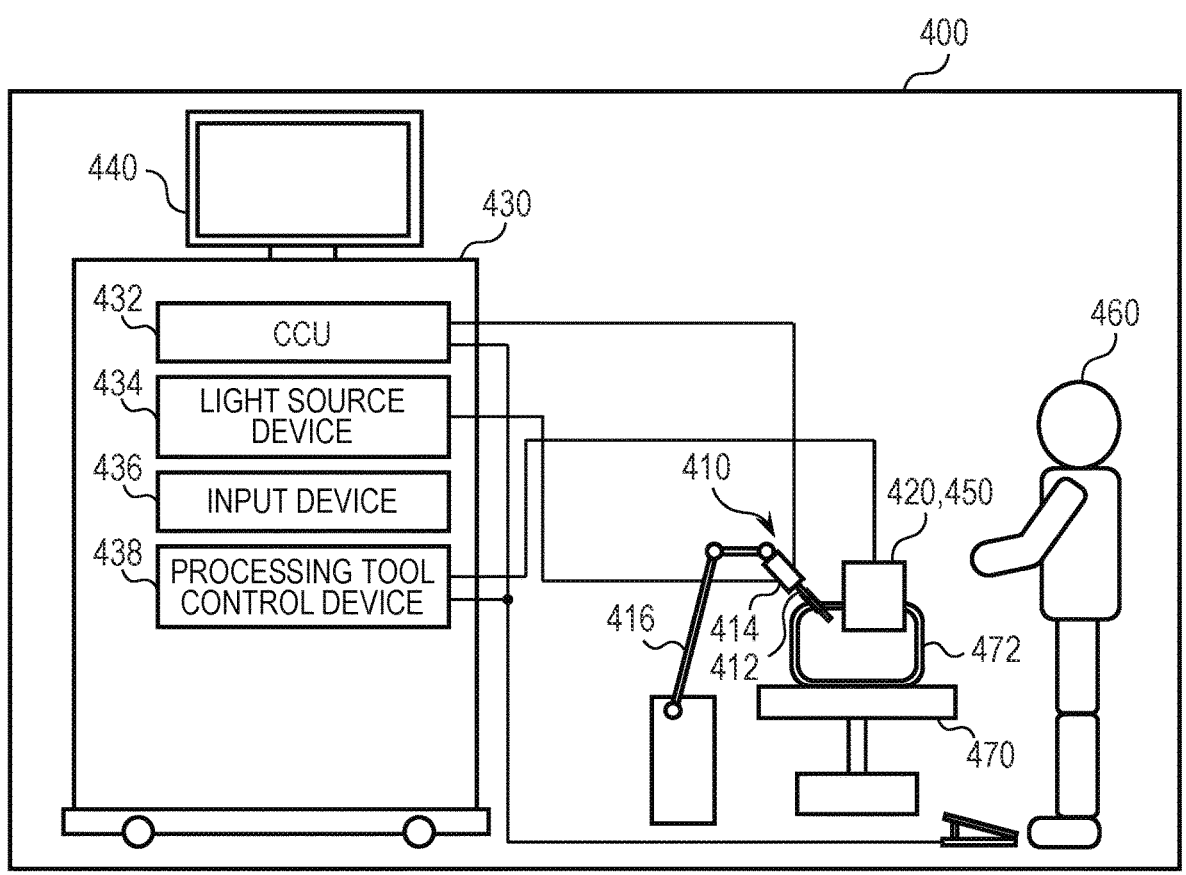
FIG. 12 is a schematic diagram illustrating a configuration example of an endoscopic surgical system according to a fifth embodiment.

An endoscopic surgical system according to a fifth embodiment will be described with reference to FIG. 12. FIG. 12 is a schematic diagram illustrating a configuration example of the endoscopic surgical system according to the present embodiment. In the present embodiment, an endoscopic surgical system will be described as an example of a photodetection system to which the photoelectric conversion device 100 according to the first or the second embodiment is applied.

FIG. 12 illustrates a state in which an operator (surgeon) 460 performs an operation on a patient 472 on a patient bed 470 using an endoscopic surgical system 400.

As illustrated in FIG. 12, the endoscopic surgical system 400 of the present embodiment may include an endoscope 410, a surgical tool 420, and a cart 430 on which various devices for endoscopic surgery are mounted. The cart 430 may include a CCU (Camera Control Unit) 432, a light source device 434, an input device 436, a processing tool control device 438, a display device 440, and the like.

The endoscope 410 includes a lens barrel 412 in which a region of a predetermined length from the tip is inserted into the body cavity of the patient 472, and a camera head 414 connected to the base end of the lens barrel 412. Although FIG. 12 illustrates the endoscope 410 configured as a so-called rigid mirror having a rigid lens barrel 412, the endoscope 410 may be configured as a so-called flexible mirror having a flexible lens barrel. The endoscope 410 is movably held by an arm 416.

An opening into which an objective lens is fitted is provided at the tip of the lens barrel 412. A light source device 434 is connected to the endoscope 410, and light generated by the light source device 434 is guided to the tip of the lens barrel 412 by a light guide extended inside the lens barrel 412, and is irradiated toward an observation target in the body cavity of the patient 472 via the objective lens. The endoscope 410 may be a direct-view mirror, a perspective mirror, or a side-view mirror.

An optical system and a photoelectric conversion device (not illustrated) are provided inside the camera head 414, and reflected light (observation light) from an observation target is focused on the photoelectric conversion device by the optical system. The photoelectric conversion device photoelectrically converts the observation light and generates an electric signal corresponding to the observation light, that is, an image signal corresponding to the observation image. As the photoelectric conversion device, the photoelectric conversion device 100 described in any of the first and second embodiments may be used. The image signal is transmitted to the CCU 432 as raw data.

The CCU 432 is configured by a CPU (central processing unit), a GPU (graphics processing unit), or the like, and controls overall operations of the endoscope 410 and the display device 440. Further, the CCU 432 receives an image signal from the camera head 414, and performs various kinds of image processing for displaying an image based on the image signal, such as development processing (demosaic processing).

The display device 440 displays an image based on the image signal subjected to the image processing by the CCU 432 under the control of the CCU 432.

The light source device 434 is constituted by, for example, a light source such as an LED (Light Emitting Diode), and supplies irradiation light to the endoscope 410 when capturing an image of a surgical part or the like.

The input device 436 is an input interface to the endoscopic surgical system 400. The user may input various kinds of information and input instructions to the endoscopic surgical system 400 via the input device 436.

The processing tool control device 438 controls the actuation of the energy treatment tool 450 for tissue ablation, incision, blood vessel sealing, etc.

The light source device 434 for supplying irradiation light to the endoscope 410 when capturing an image of the surgical portion may be constituted by a white light source constituted by, for example, an LED, a laser light source, or a combination thereof. When a white light source is configured by a combination of RGB laser light sources, the output intensity and the output timing of each color (each wavelength) may be controlled with high accuracy, so that the white balance of the captured image may be adjusted in the light source device 434. In this case, it is also possible to capture an image corresponding to each of RGB in a time-division manner by irradiating the observation target with laser light from each of the RGB laser light sources in a time-division manner and controlling driving of the imaging device of the camera head 414 in synchronization with the irradiation timing. According to this method, a color image may be obtained without providing a color filter in the imaging device.

Further, the driving of the light source device 434 may be controlled so as to change the intensity of the output light at predetermined time intervals. By controlling the driving of the imaging device of the camera head 414 in synchronization with the timing of changing the intensity of the light to acquire an image in a time-division manner, and by synthesizing the image, it is possible to generate an image in a high dynamic range without so-called blocked up shadows and blown out highlights.

The light source device 434 may be configured to be able to supply light in a predetermined wavelength band corresponding to special light observation. In special light observation, for example, wavelength dependence of light absorption in body tissue is used. Specifically, a predetermined tissue such as a blood vessel in the surface layer of the mucosa is imaged with high contrast by irradiating light in a narrow band compared to the irradiation light (i.e., white light) during normal observation. Alternatively, in special light observation, fluorescence observation for obtaining an image by fluorescence generated by irradiation with excitation light may be performed. In the fluorescence observation, excitation light may be irradiated to the body tissue to observe fluorescence from the body tissue, or a reagent such as indocyanine green (ICG) may be locally poured into the body tissue and the body tissue may be irradiated with excitation light corresponding to the fluorescence wavelength of the reagent to obtain a fluorescence image. The light source device 434 may be configured to be able to supply narrowband light and/or excitation light corresponding to such special light observation.

As described above, according to the present embodiment, by configuring the endoscopic surgical system using the photoelectric conversion devices of the first or the second embodiment, it is possible to realize an endoscopic surgical system capable of acquiring images of higher quality.

Sixth Embodiment

Figure 13A:
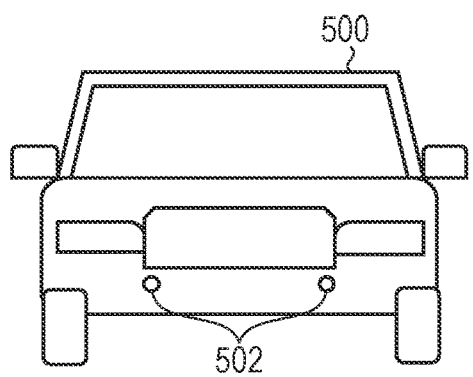
FIG. 13A, FIG. 13B, and FIG. 13C are schematic diagrams illustrating a configuration example of a movable object according to a sixth embodiment.
Figure 13B:
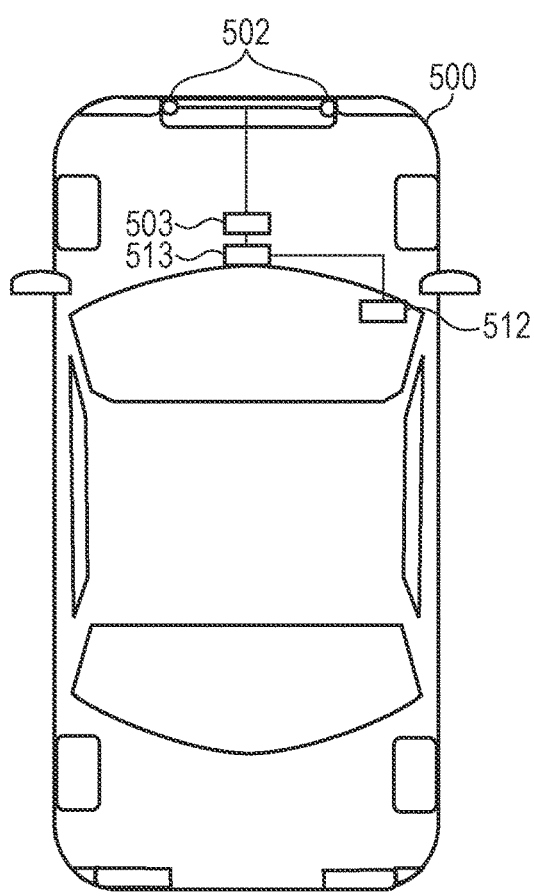
Figure 13C:
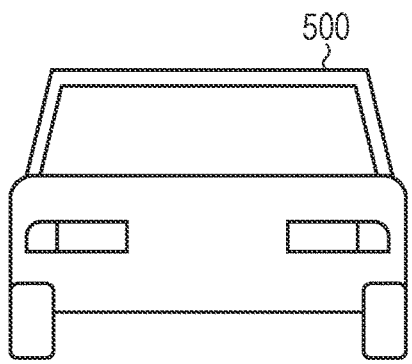
Figure 14:
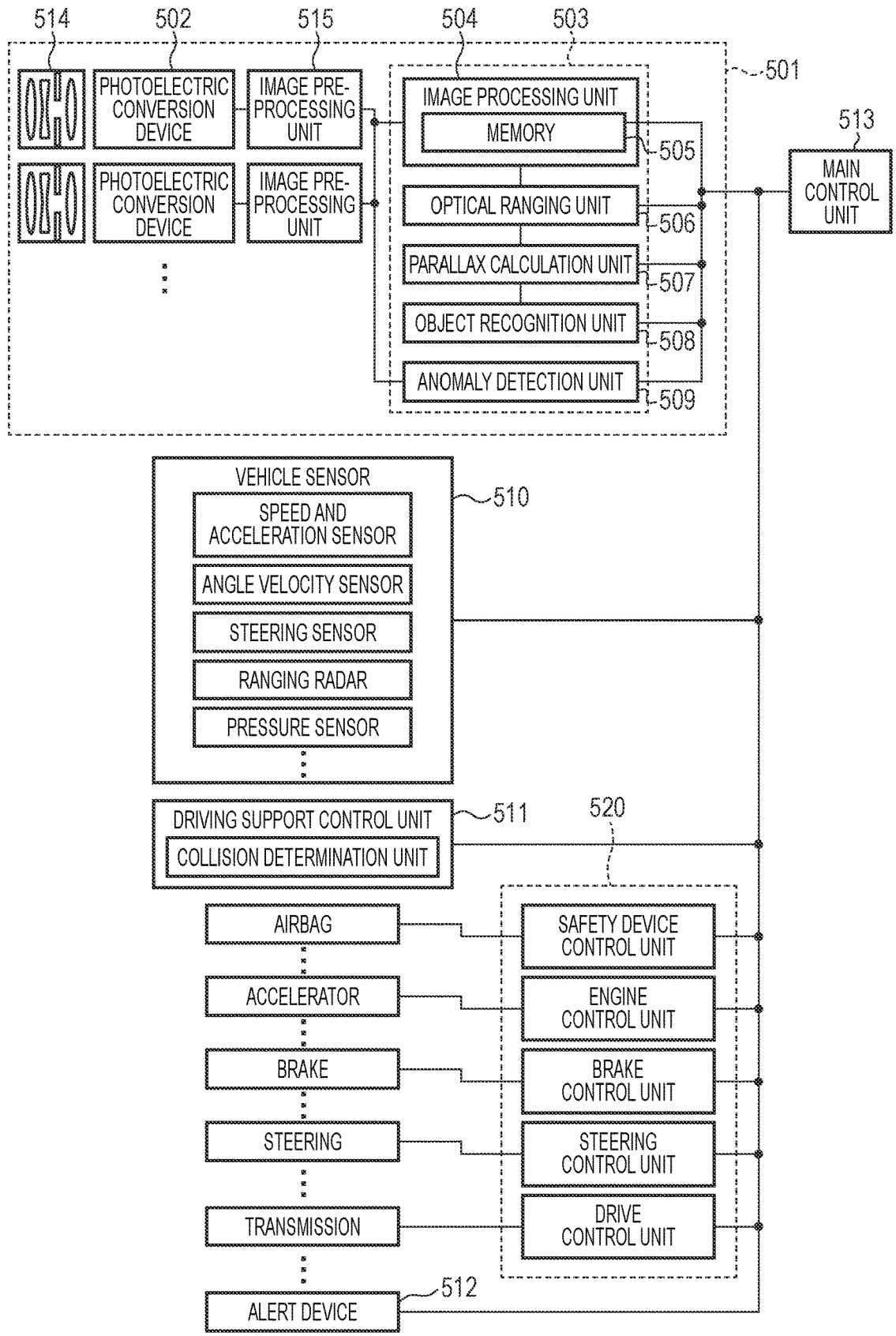
FIG. 14 is a block diagram illustrating a schematic configuration of a photodetection system according to a sixth embodiment.
Figure 15:
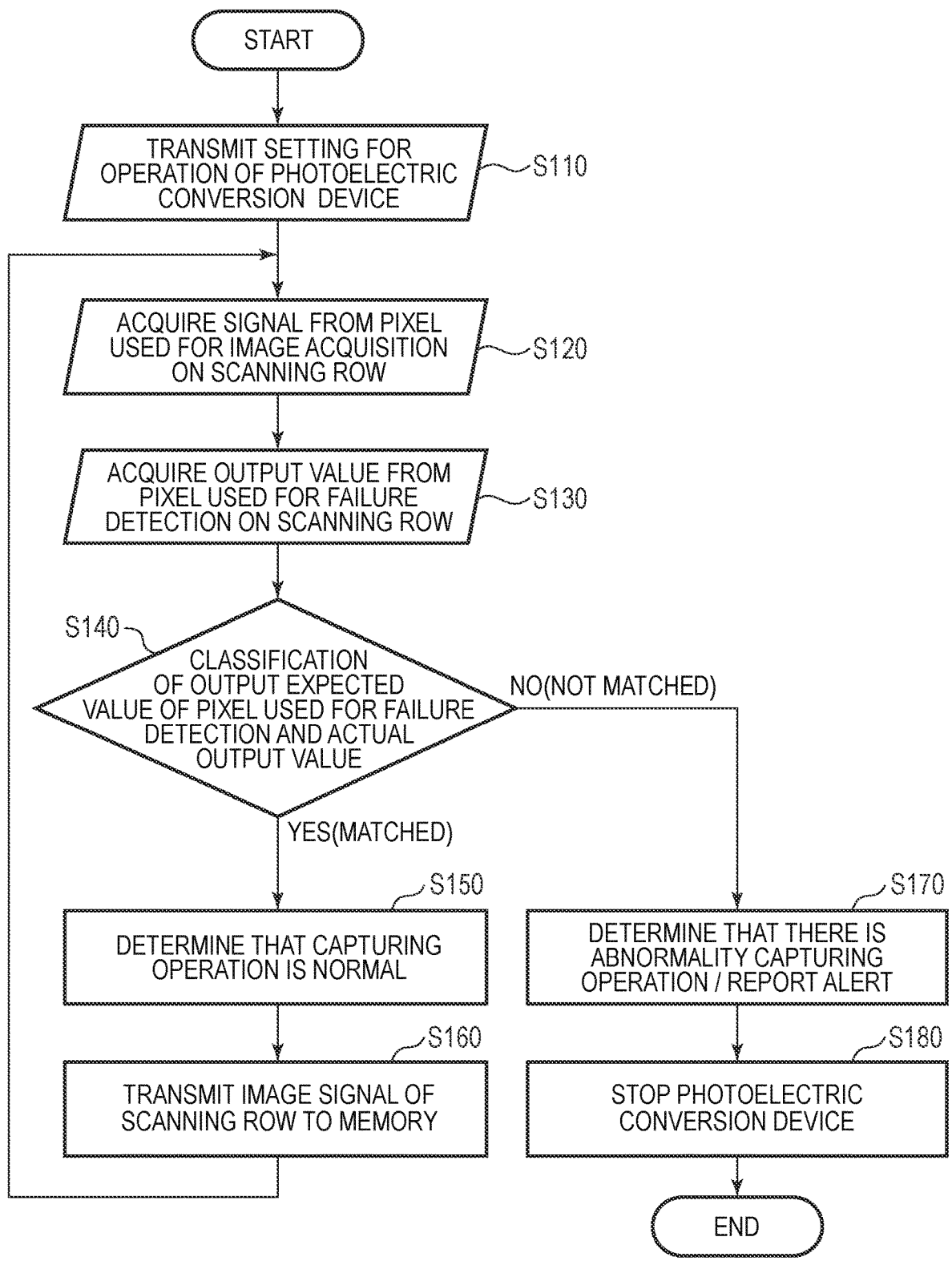
FIG. 15 is a flowchart illustrating the operation of the photodetection system according to the sixth embodiment.

A photodetection system and a movable object according to a sixth embodiment will be described with reference to FIG. 13A to FIG. 15. FIG. 13A to FIG. 13C are schematic diagrams illustrating an example of the configuration of a movable object according to the present embodiment. FIG. 14 is a block diagram illustrating a schematic configuration of the photodetection system according to the present embodiment. FIG. 15 is a flowchart illustrating the operation of the photodetection system according to the present embodiment. In the present embodiment, an application example to an in-vehicle camera will be described as a photodetection system to which the photoelectric conversion device 100 according to the first or the second embodiment is applied.

FIG. 13A to FIG. 13C are schematic diagrams illustrating a configuration example of a movable object (a vehicle system) according to the present embodiment. FIG. 13A to FIG. 13C illustrate a configuration of a vehicle 500 (automobile) as an example of a vehicle system in which a photodetection system to which the photoelectric conversion device according to the first or the second embodiment is applied is incorporated. FIG. 13A is a schematic front view of the vehicle 500, FIG. 13B is a schematic plan view of the vehicle 500, and FIG. 13C is a schematic rear view of the vehicle 500. The vehicle 500 includes a pair of photoelectric conversion devices 502 on the front side thereof. Here, the photoelectric conversion devices 502 are the photoelectric conversion device 100 described in any of the first and second embodiments. The vehicle 500 includes an integrated circuit 503, an alert device 512, and a main control unit 513.

FIG. 14 is a block diagram illustrating a configuration example of a photodetection system 501 mounted on the vehicle 500. The photodetection system 501 includes a photoelectric conversion device 502, an image pre-processing unit 515, an integrated circuit 503, and an optical system 514. The photoelectric conversion device 502 is the photoelectric conversion device 100 described in any of the first and second embodiments. The optical system 514 forms an optical image of an object onto the photoelectric conversion device 502. The photoelectric conversion device 502 converts the optical image of the object formed by the optical system 514 into an electric signal. The image pre-processing unit 515 performs predetermined signal processing on the signal output from the photoelectric conversion device 502. The function of the image pre-processing unit 515 may be incorporated in the photoelectric conversion device 502. The photodetection system 501 includes at least two sets of the optical system 514, the photoelectric conversion device 502, and the image pre-processing unit 515, and outputs from the image pre-processing unit 515 of each set are input to the integrated circuit 503.

The integrated circuit 503 is an integrated circuit for use in an imaging system, and includes an image processing unit 504, an optical ranging unit 506, a parallax calculation unit 507, an object recognition unit 508, and an anomaly detection unit 509. The image processing unit 504 processes the image signal output from the image pre-processing unit 515. For example, the image processing unit 504 performs image processing such as development processing and defect correction on the output signal of the image pre-processing unit 515. The image processing unit 504 includes a memory 505 that temporarily holds an image signal. The memory 505 may store, for example, positions of known defective pixels in the photoelectric conversion device 502.

An optical ranging unit 506 focuses and measures a subject. The parallax calculation unit 507 calculates distance measurement information (distance information) from a plurality of image data (parallax images) acquired by the plurality of photoelectric conversion devices 502. Each of the photoelectric conversion devices 502 may have a configuration capable of acquiring various kinds of information such as distance information. The object recognition unit 508 recognizes a subject such as a vehicle, a road, a sign, or a person. When the anomaly detection unit 509 detects an abnormality of the photoelectric conversion device 502, the anomaly detection unit 509 notifies the main control unit 513 of the anomaly.

The integrated circuit 503 may be realized by dedicated hardware, a software module, or a combination thereof. It may be realized by FPGA (Field Programmable Gate Array), ASIC (Application Specific Integrated Circuit), or the like, or may be realized by a combination of these.

The main control unit 513 controls overall operations of the photodetection system 501, the vehicle sensor 510, the control unit 520, and the like. The vehicle 500 may not include the main control unit 513. In this case, the photoelectric conversion device 502, the vehicle sensor 510, and the control unit 520 transmit and receive control signals via the communication network. For example, the CAN (Controller Area Network) standard may be applied to the transmission and reception of the control signal.

The integrated circuit 503 has a function of receiving a control signal from the main control unit 513 or transmitting a control signal or a set value to the photoelectric conversion device 502 by its own control unit.

The photodetection system 501 is connected to the vehicle sensor 510, and may detect a traveling state of the own vehicle such as a vehicle speed, a yaw rate, and a steering angle, an environment outside the own vehicle, and a state of another vehicle or obstacle. The vehicle sensor 510 is also a distance information acquisition means for acquiring distance information to an object. The photodetection system 501 is connected to a driving support control unit 511 that performs various driving support functions such as automatic steering, automatic cruise, and collision prevention function. In particular, regarding the collision determination function, the collision estimation, collision presence, and collision absence with another vehicle or obstacle are determined based on the detection result of the photodetection system 501 or the vehicle sensor 510. Thus, avoidance control when collision is estimated and start-up of the safety device at the time of collision are performed.

The photodetection system 501 is also connected to an alert device 512 that issues an alarm to the driver based on the determination result of the collision determination unit. For example, when the possibility of collision is high as the determination result of the collision determination unit, the main control unit 513 performs vehicle control for avoiding collision and reducing damage by applying a brake, returning an accelerator, suppressing engine output, or the like. The alert device 512 sounds an alarm such as a sound, displays alert information on a display unit screen of a car navigation system, a meter panel, or the like, and applies vibration to a seatbelt or a steering wheel, thereby warning the user.

In the present embodiment, an image of the periphery of the vehicle, for example, the front or the rear is taken by the photodetection system 501. FIG. 13B illustrates an arrangement example of the photodetection system 501 when an image of the front of the vehicle is captured by the photodetection system 501.

As described above, the photoelectric conversion device 502 is disposed in front of the vehicle 500. Specifically, when the center line with respect to the advancing/retracting direction or the outer shape (for example, the vehicle width) of the vehicle 500 is regarded as the axis of symmetry, and the two photoelectric conversion devices 502 are arranged in line symmetry with respect to the axis of symmetry, it is preferable in terms of acquiring distance information between the vehicle 500 and the object to be captured and determining the possibility of collision. The photoelectric conversion device 502 is preferably arranged so as not to interfere with the field of view of the driver when the driver visually recognizes the situation outside the vehicle 500 from the driver's seat. The alert device 512 is preferably arranged to easily enter the field of view of the driver.

Next, a failure detection operation of the photoelectric conversion device 502 in the photodetection system 501 will be described with reference to FIG. 15. The failure detection operation of the photoelectric conversion device 502 may be performed according to steps S110 to S180 illustrated in FIG. 15.

Step S110 is a step of performing setting at the time of startup of the photoelectric conversion device 502. That is, a setting for the operation of the photoelectric conversion device 502 is transmitted from the outside of the photodetection system 501 (for example, the main control unit 513) or from the inside of the photodetection system 501, and the imaging operation and the failure detection operation of the photoelectric conversion device 502 are started.

Next, in step S120, a pixel signal is acquired from the effective pixel. In step S130, an output value from a failure detection pixel provided for failure detection is acquired. The failure detection pixel includes a photoelectric conversion element in the same manner as the effective pixel. A predetermined voltage is written into the photoelectric conversion element. The failure detection pixel outputs a signal corresponding to the voltage written in the photoelectric conversion element. Note that steps S120 and S130 may be reversed.

Next, in step S140, a classification of the output expected value of the failure detection pixel and the actual output value from the failure detection pixel. When the output expected value matches the actual output value as a result of the classification in step S140, the process proceeds to step S150, where it is determined that the imaging operation is normally performed, and the process step proceeds to step S160. In step S160, the pixel signal of the scanning row is transmitted to the memory 505 and is primarily stored. After that, the process returns to step S120, and the failure detection operation is continued. On the other hand, when the output expected value does not match the actual output value as a result of the classification in step S140, the processing step proceeds to step S170. In step S170, it is determined that there is an abnormality in the imaging operation, and an alert is notified to the main control unit 513 or the alert device 512. The alert device 512 displays that an abnormality has been detected on the display unit. Thereafter, in step S180, the photoelectric conversion device 502 is stopped, and the operation of the photodetection system 501 is ended.

In the present embodiment, an example in which the flowchart is looped for each row is exemplified, but the flowchart may be looped for each plurality of rows, or the failure detection operation may be performed for each frame. The alarm in step S170 may be notified to the outside of the vehicle via the wireless network.

Further, in the present embodiment, the control in which the vehicle does not collide with another vehicle has been described, but the disclosure is also applicable to a control in which the vehicle is automatically driven following another vehicle, a control in which the vehicle is automatically driven so as not to protrude from the lane, and the like. Further, the photodetection system 501 may be applied not only to a vehicle such as an own vehicle, but also to a movable object (mobile device) such as a ship, an aircraft, or an industrial robot. In addition, the disclosure may be applied not only to a movable object but also to equipment using object recognition in a wide range such as an intelligent transport system (ITS).

Seventh Embodiment

Figure 16A:
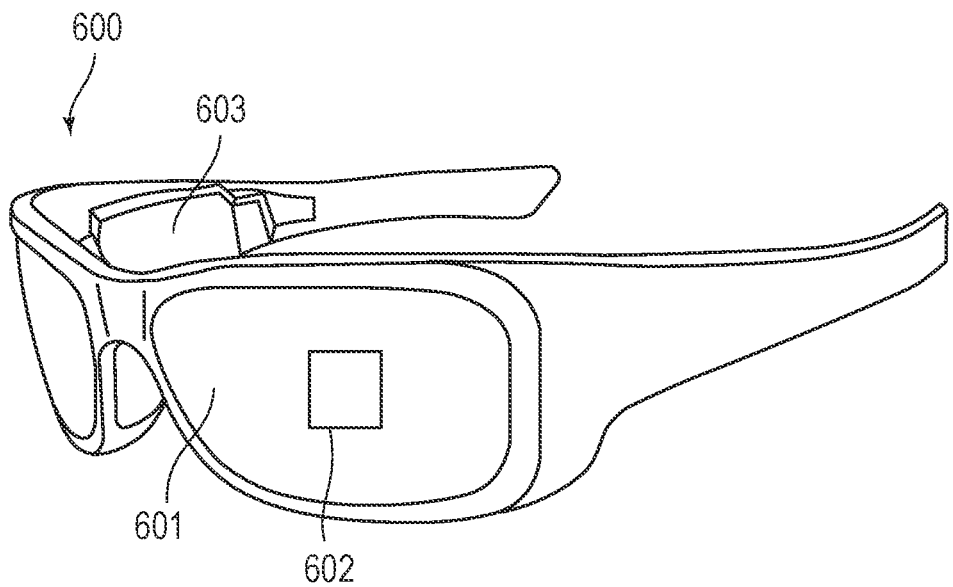
FIG. 16A and FIG. 16B are schematic diagrams illustrating a schematic configuration of a photodetection system according to a seventh embodiment.
Figure 16B:
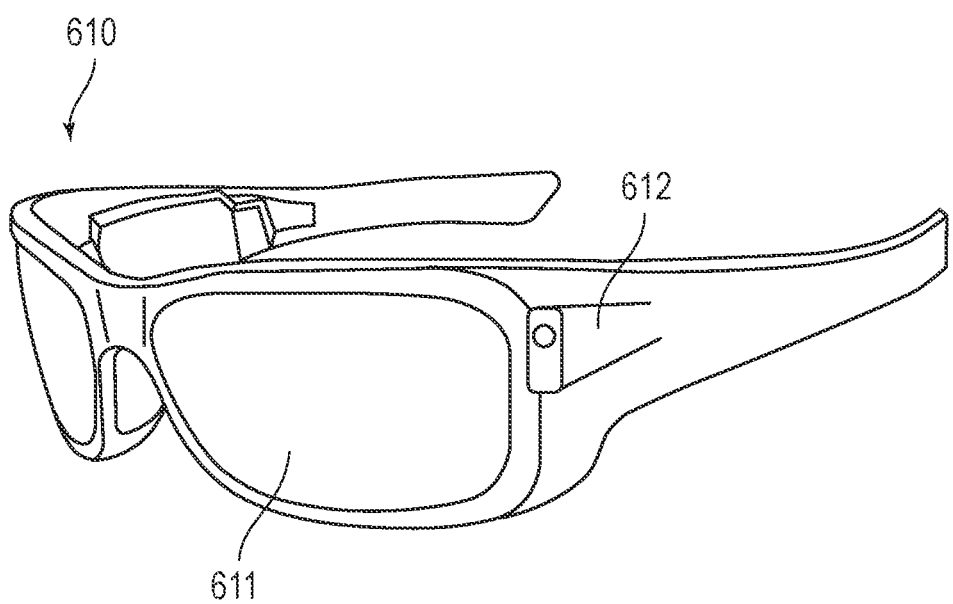

A photodetection system according to a seventh embodiment will be described with reference to FIG. 16A and FIG. 16B. FIG. 16A and FIG. 16B are schematic diagrams illustrating a configuration example of the photodetection system according to the present embodiment. In the present embodiment, an application example to eyeglasses (smartglasses) will be described as a photodetection system to which the photoelectric conversion device 100 according to the first or the second embodiment is applied.

FIG. 16A illustrates eyeglasses 600 (smartglasses) according to one application example. The eyeglasses 600 include a lens 601, a photoelectric conversion device 602, and a control device 603.

The photoelectric conversion device 602 is the photoelectric conversion device 100 described in any of the first and second embodiments, and is provided in the lens 601. One photoelectric conversion device 602 or a plurality of photoelectric conversion devices 602 may be provided. When a plurality of photoelectric conversion devices 602 are used, a plurality of types of photoelectric conversion devices 602 may be used in combination. The arrangement position of the photoelectric conversion device 602 is not limited to that illustrated in FIG. 16A. A display device (not illustrated) including a light emitting device such as an OLED or an LED may be provided on the back side of the lens 601.

The control device 603 functions as a power supply for supplying power to the photoelectric conversion device 602 and the above-described display device. The control device 603 has a function of controlling operations of the photoelectric conversion device 602 and the display device. The lens 601 is provided with an optical system for focusing light on the photoelectric conversion device 602.

FIG. 16B illustrates eyeglasses 610 (smartglasses) according to another application example. The eyeglasses 610 include a lens 611 and a control device 612. A photoelectric conversion device (not illustrated) corresponding to the photoelectric conversion device 602 and a display device may be mounted on the control device 612.

The lens 611 is provided with a photoelectric conversion device in the control device 612 and an optical system for projecting light from the display device, and an image is projected thereon. The control device 612 functions as a power supply for supplying power to the photoelectric conversion device and the display device, and has a function of controlling the operation of the photoelectric conversion device and the display device.

The control device 612 may further include a line-of-sight detection unit that detects the line of sight of the wearer. In this case, the control device 612 is provided with an infrared light emitting unit, and the infrared light emitted from the infrared light emitting unit may be used to detect the line of sight. Specifically, the infrared light emitting unit emits infrared light to the eyeball of the user who is looking at the display image. A captured image of the eyeball is obtained by detecting reflected light of the emitted infrared light from the eyeball by an imaging unit having a light receiving element. The reduction means for reducing light from the infrared light emitting unit to the display section in a plan view may reduce deterioration in image quality.

The line of sight of the user with respect to the display image may be detected from the captured image of the eyeball obtained by capturing infrared light. Any known method may be applied to line-of-sight detection using a captured image of an eyeball. As an example, a line-of-sight detection method based on a Purkinje image caused by reflection of irradiation light on the cornea may be used. More specifically, line-of-sight detection processing based on the pupil cornea reflection method is performed. A line of sight of the user is detected by calculating a line-of-sight vector representing the direction (rotation angle) of the eyeball based on the pupil image and the Purkinje image included in the captured image of the eyeball using the pupil cornea reflection method.

The display device of the present embodiment may include a photoelectric conversion device having a light receiving element, and may be configured to control a display image based on line-of-sight information of a user from the photoelectric conversion device. Specifically, the display device determines, based on the line-of-sight information, a first viewing area to be gazed by the user and a second viewing area other than the first viewing area. The first viewing area and the second viewing area may be determined by a control device of the display device or may be determined by an external control device. When the determination is made by the external control device, the determination is transmitted to the display device via the communication. In the display area of the display device, the display resolution of the first viewing area may be controlled to be higher than the display resolution of the second viewing area. That is, the resolution of the second viewing area may be lower than the resolution of the first viewing area.

The display area may include a first display area and a second display area different from the first display area, and may be configured to determine an area having a high priority from the first display area and the second display area based on the line-of-sight information. The first display area and the second display area may be determined by a control device of the display device or may be determined by an external control device. When the determination is made by the external control device, the determination is transmitted to the display device via the communication. The resolution of the high priority region may be controlled to be higher than the resolution of the regions other than the high priority region. That is, the resolution of a region having a relatively low priority may be low.

Note that an AI (artificial intelligence) device, machine, or apparatus may be used to determine the first viewing area or the region with high priority. The AI may be a model configured to estimate an angle of a line of sight and a distance to a target object ahead of the line of sight from an image of an eyeball and a direction in which the eyeball of the image is actually viewed as teacher data. The AI program may be provided by a display device, a photoelectric conversion device, or an external device. When the external device has the function, the function is transmitted to the display device via the communication.

In the case of performing display control based on visual recognition detection, the disclosure may be preferably applied to smartglasses further including a photoelectric conversion device for imaging an external image. The smartglasses may display the captured external information in real time.

Modified Embodiments

The disclosure is not limited to the above embodiments, and various modifications are possible.

For example, an example in which a configuration of a part of any embodiment is added to another embodiment or an example in which a configuration of a part of another embodiment is substituted is also an embodiment of the disclosure.

In the first embodiment, a signal is output from the connection node between the cathode of the photon detection element 22 and the quenching element 24, but the configuration of the photoelectric conversion unit 20 is not limited to this. For example, the quenching element 24 may be connected to the anode side of the photon detection element 22, and a signal may be output from a connection node between the anode of the photon detection element 22 and the quenching element 24.

Further, a switch such as a transistor may be provided between the photon detection element 22 and the quenching element 24 and/or between the photoelectric conversion unit 20 and the pixel signal processing unit 30 to control an electrical connection state between them. Further, a switch such as a transistor may be provided between the node to which the voltage VH is supplied and the quenching element 24 and/or between the node to which the voltage VL is supplied and the photon detection element 22 to control the electrical connection state therebetween.

Although the counter is exemplified as the processing circuit 34 in the first embodiment, the processing circuit 34 may be configured by a TDC (Time to Digital Converter) and a memory. In this case, the generation timing of the pulse signal output from the waveform shaping circuit 32 is converted into a digital signal by the TDC. When the timing of the pulse signal is measured, the control pulse pREF (reference signal) is supplied from the vertical scanning circuit unit 40 to the TDC via the control line 14. The TDC acquires, as a digital signal, a signal obtained by setting the input timing of the signal output from each pixel 12 as a relative time with reference to the control pulse pREF.

It should be noted that all of the above-described embodiments are merely specific examples for carrying out the disclosure, and the technical scope of the disclosure should not be construed as being limited thereto. That is, the disclosure can be implemented in various forms without departing from the technical idea thereof or the main characteristics thereof.

According to the disclosure, high functionality and low power consumption of a photoelectric conversion device may be realized.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-008649, filed Jan. 22, 2021, which is hereby incorporated by reference herein in its entirety.

What is claimed is:

1. A photoelectric conversion device comprising:
a plurality of pixels each including
a photoelectric conversion unit including an avalanche photodiode that multiplies charge generated by an incident of photon by avalanche multiplication, and outputting a signal in accordance with the incident of photon,
a processing circuit that processes a signal output from the photoelectric conversion unit, and
a pixel output circuit that controls an output of a signal processed by the processing circuit;
a data line connected to the plurality of pixels; and
a receiving circuit that receives pixel signals output from the plurality of pixels via the data line,
wherein an off-state leakage current of a first transistor included in the receiving circuit is smaller than an off-state leakage current of a second transistor included in the pixel output circuit.

2. The photoelectric conversion device according to claim 1, wherein an absolute value of a threshold voltage of the first transistor is greater than an absolute value of a threshold voltage of the second transistor.

3. The photoelectric conversion device according to claim 1, wherein an off-state leakage current of a third transistor included in the processing circuit is smaller than the off-state leakage current of the second transistor included in the pixel output circuit.

4. The photoelectric conversion device according to claim 3, wherein an absolute value of a threshold voltage of the third transistor is greater than an absolute value of a threshold voltage of the second transistor.

5. A photoelectric conversion device comprising:
a plurality of pixels each including
a photoelectric conversion unit including an avalanche photodiode that multiplies charge generated by an incident of photon by avalanche multiplication, and outputting a signal in accordance with the incident of photon, a processing circuit that processes a signal output from the photoelectric conversion unit, and a pixel output circuit that controls an output of a signal processed by the processing circuit;

a data line connected to the plurality of pixels; and a receiving circuit that receives pixel signals output from the plurality of pixels via the data line, wherein, in a channel region of a first transistor included in the receiving circuit, an impurity concentration of an impurity of the same conductivity type as a conductivity type of the first transistor is a first concentration, and wherein, in a channel region of a second transistor included in the pixel output circuit, an impurity concentration of an impurity of the same conductivity type as a conductivity type of the second transistor is a second concentration higher than the first concentration.

6. The photoelectric conversion device according to claim 5, wherein, in a channel region of a third transistor included in the processing circuit, an impurity concentration of an impurity of the same conductivity type as a conductivity type of the third transistor is a third concentration lower than the second concentration.

7. The photoelectric conversion device according to claim 1, wherein the pixel output circuit is an open drain buffer circuit.

8. The photoelectric conversion device according to claim 7, wherein each of the first transistor and the second transistor forms a part of an electrical path from a power supply voltage node to a reference voltage node via the data line.

9. The photoelectric conversion device according to claim 7, wherein the data line includes a pair of signal lines from which a non-inverted signal of the pixel signal and an inverted signal of the pixel signal are output.

10. The photoelectric conversion device according to claim 1, wherein a gate width of the first transistor is larger than a gate width of the second transistor.

11. The photoelectric conversion device according to claim 1, wherein the receiving circuit includes a reset circuit that resets a voltage of the data line.

12. The photoelectric conversion device according to claim 1, wherein the receiving circuit includes a determination circuit that determines a signal level of the data line.

13. The photoelectric conversion device according to claim 1, wherein the processing circuit includes a counter.

14. The photoelectric conversion device according to claim 1, wherein the processing circuit includes a time-to-digital conversion circuit.

15. The photoelectric conversion device according to claim 1, wherein the device is constituted by stacking a first substrate provided with the avalanche photodiode and a second substrate provided with the processing circuit, the pixel output circuit, and the receiving circuit.

16. A photodetection system comprising:
the photoelectric conversion device according to claim 1; and
a signal processing device that processes a signal output from the photoelectric conversion device.

17. A photodetection system according to claim 16, wherein the signal processing device generates a distance image representing distance information to an object based on the signal.

18. A movable object comprising:
the photoelectric conversion device according to claim 1;
a distance information acquisition unit that acquires distance information to an object from a parallax image based on a signal output from the photoelectric conversion device; and
a control unit that controls the movable object based on the distance information.

* * * * *